US010530136B2

United States Patent
Terashima et al.

(10) Patent No.: US 10,530,136 B2
(45) Date of Patent: Jan. 7, 2020

(54) CABLE COVER

(71) Applicant: J.S.T. Mfg. Co., Ltd., Osaka-shi (JP)

(72) Inventors: Toshihiro Terashima, Osaka (JP); Tomoya Fujii, Miyoshi (JP)

(73) Assignee: J.S.T. MFG. CO., LTD., Osaka-shi (JP)

( * ) Notice: Subject to any disclaimer, the term of this patent is extended or adjusted under 35 U.S.C. 154(b) by 0 days.

(21) Appl. No.: 15/366,318

(22) Filed: Dec. 1, 2016

(65) Prior Publication Data

US 2017/0179697 A1   Jun. 22, 2017

(30) Foreign Application Priority Data

Dec. 21, 2015   (JP) .................................. 2015-248777

(51) Int. Cl.

| | | |
|---|---|---|
| *H02G 3/04* | (2006.01) | |
| *F16L 3/10* | (2006.01) | |
| *H02G 15/007* | (2006.01) | |
| *H02G 3/06* | (2006.01) | |
| *H01R 13/56* | (2006.01) | |

(52) U.S. Cl.
CPC .......... *H02G 3/0462* (2013.01); *F16L 3/1091* (2013.01); *H01R 13/562* (2013.01); *H02G 3/0691* (2013.01); *H02G 15/007* (2013.01)

(58) Field of Classification Search
CPC ... F16L 3/1091; H02G 3/0462; H02G 3/0691; H02G 15/007; H01R 13/562
USPC ........ 138/106, 109, 110, 156, 167, 168, 177
See application file for complete search history.

(56) References Cited

U.S. PATENT DOCUMENTS

| | | | | |
|---|---|---|---|---|
| 5,792,993 A | * | 8/1998 | Rinderer .............. | H02G 3/0608 138/92 |
| 6,002,089 A | * | 12/1999 | Hemingway ........ | H02G 3/0406 174/97 |
| 7,183,502 B1 | * | 2/2007 | Johnston .............. | H02G 3/0431 174/480 |
| 7,476,121 B2 | | 1/2009 | Tsuji | |

(Continued)

FOREIGN PATENT DOCUMENTS

| | | |
|---|---|---|
| CN | 103779721 A | 5/2014 |
| JP | 2005-149941 | 6/2005 |

(Continued)

OTHER PUBLICATIONS

Office Action of Japanese Patent Application No. 2015-248777 dated Sep. 3, 2019 (4 sheets, 4 sheets translation, 8 sheets total).

*Primary Examiner* — Eric Keasel
*Assistant Examiner* — David R Deal
(74) *Attorney, Agent, or Firm* — Kratz, Quintos & Hanson, LLP

(57) ABSTRACT

A cable cover of this invention is used for guiding the orientation of a cable that extends out from a connector. This cable cover includes a pair of divided bodies, a cable passage, and a supporting portion. The pair of divided bodies have a pair of joining faces that are to be joined to each other. The cable passage includes a bent passage portion for housing a bent portion of the cable. The supporting portion extends as a curved surface along the forward direction of the cable in the bent passage portion, and is configured to be able to support an inward portion of the bend in the bent portion.

5 Claims, 12 Drawing Sheets

(56) References Cited

U.S. PATENT DOCUMENTS

| | | | |
|---|---|---|---|
| 8,757,560 B2* | 6/2014 | Darnell | H02G 3/0456 |
| | | | 174/68.1 |
| 8,914,950 B1* | 12/2014 | Engerdahl | H02G 3/06 |
| | | | 24/122.6 |
| 9,163,698 B2* | 10/2015 | Kaihotsu | F16G 13/16 |
| 2002/0177351 A1* | 11/2002 | Kihira | H01R 13/5833 |
| | | | 439/468 |
| 2007/0224852 A1* | 9/2007 | Gouzien | H01R 13/565 |
| | | | 439/76.1 |
| 2008/0280467 A1 | 11/2008 | Tsuji | |
| 2008/0308316 A1* | 12/2008 | Ferragut | H02G 3/0633 |
| | | | 174/350 |
| 2009/0242235 A1* | 10/2009 | Kawakami | B60R 16/0222 |
| | | | 174/153 G |
| 2014/0120763 A1 | 5/2014 | Itsuki | |
| 2015/0204461 A1* | 7/2015 | Ben Jacov | F16L 3/123 |
| | | | 138/106 |

FOREIGN PATENT DOCUMENTS

| | | |
|---|---|---|
| JP | 2008-282631 A | 11/2008 |
| JP | 2012-234659 | 11/2012 |
| JP | 5664921 B | 2/2015 |
| JP | 2015-210966 A | 11/2015 |

\* cited by examiner

CABLE COVER

CROSS-REFERENCE TO RELATED APPLICATION

This application claims priority to Japanese Patent Application No. 2015-248777. The entire disclosure of Japanese Patent Application No. 2015-248777 is hereby incorporated herein by reference.

BACKGROUND OF THE INVENTION

1. Field of the Invention

The present invention relates to a cable cover for provision on a cable that extends out from an electrical connector.

2. Description of Related Art

A connector cover for attachment to an electrical connector is known (e.g., see the specification of JP 5664921B). The connector cover is used for making a 90° change, for example, in the orientation of an electrical wire that extends out from the housing of the electrical connector. The cover disclosed in the specification of JP 5664921B is attached to the housing of the electrical connector.

The cover has a pair of divided bodies. These two divided bodies are joined to each other so as to sandwich one end portion of the housing of the electrical connector, thus forming the cover. The electrical wire extending out from the electrical connector passes through a passage formed in the cover. In the cover disclosed in the specification of JP 5664921B, the electrical wire is bent approximately 90° to form an "L" shape. Also, a corrugated tube is attached to the exit of the cover. The corrugated tube is attached to the cover by being sandwiched between the pair of divided bodies. The electrical wire extends from the cover interior to the outside of the cover via the corrugated tube. An electrical wire protection rib is provided in the vicinity of the portion of the electrical wire where one end of the corrugated tube is arranged.

The electrical wire protection rib is provided on one of the divided bodies and extends toward the other divided body. Before the two divided bodies are joined to each other, the electrical wire is arranged in the one divided body. One end of the corrugated tube is also aligned with the one divided body. The other divided body is then joined to the one divided body in this state. Accordingly, the electrical wire and the one end of the corrugated tube are housed in the cover. The one end of the corrugated tube is also sandwiched by the cover. Due to the electrical wire protection rib, the electrical wire is prevented from reaching a position where it would be sandwiched between the one end of the corrugated tube and the cover. This therefore prevents the electrical wire from being sandwiched between the corrugated tube and the divided bodies. Also, the pair of divided bodies are joined to each other in the state where the electrical wire is supported by the electrical wire protection rib. This therefore makes it possible to prevent the electrical wire from being sandwiched between the joined surfaces of the pair of divided bodies. The above configuration suppresses wire breakage.

SUMMARY OF THE INVENTION

However, the electrical wire protection rib disclosed in the specification of JP 5664921B is shaped so as to protrude toward a bent portion of the electrical wire, and a large load tends to be applied to the electrical wire when it comes into contact with the electrical wire. In particular, in the case where tensile force acts on the electrical wire for example, if the electrical wire is forcibly brought into contact with the electrical wire protection rib, a large load is applied to the electrical wire.

In light of the circumstances described above, an object of the present invention is to provide a cable cover that suppresses the pinching of a cable during assembly of the cable cover, and reduces the load that is applied to the cable inside the cable cover.

(1) A cable cover according to an aspect of this invention includes: a pair of divided bodies that respectively include a pair of joining faces that are to be joined to each other, the pair of divided bodies being joined together so as to sandwich a cable that extends from an electrical connector to the outside of the electrical connector; a cable passage that includes a bent passage portion in which a predetermined bent portion of the cable is to be housed, the cable passage being provided inside the pair of divided bodies, and being configured to house at least a portion of the cable; and a supporting portion that is provided on a divided body out of the pair of divided bodies, the supporting portion extending as a curved surface along a forward direction of the cable in the bent passage portion, and being configured to be able to support an inward portion of a bend in the bent portion.

According to this configuration, when the pair of divided bodies are joined to each other, the cable can be arranged inside the pair of divided bodies while being supported by the supporting portion. Accordingly, when the pair of divided bodies are joined to each other, it is possible to suppress the case where the cable becomes arranged between the pair of joining faces. Accordingly, it is possible to suppress pinching of the cable during assembly of the cable cover. Also, the supporting portion extends as a curved surface along the forward direction of the cable in the bent passage portion, and is configured to be able to support the inward portion of the bend in the bent portion. In this way, the supporting portion is arranged so as to extend along the bent shape of the cable. Accordingly, when the cable and the supporting portion come into contact with each other, the supporting portion can support a wider range of the bent portion of the cable, thus making it possible to suppress the application of a large amount of stress to the bent portion of the cable. Accordingly, it is possible to alleviate the load applied to the cable from the supporting portion. As described above, with this cable cover, it is possible to suppress the pinching of a cable during assembly of the cable cover, and reduce the load that is applied to the cable inside the cable cover.

(2) It is preferable that the supporting portion is provided on one divided body out of the pair of divided bodies, and the supporting portion protrudes from the joining face of the one divided body in a facing direction in which the joining faces of the pair of divided bodies face each other.

According to this configuration, the supporting portion enters the space on the other divided body side at a relatively early timing when the pair of divided bodies are joined to each other. Accordingly, the supporting portion can function as an obstruction wall that prevents the intrusion of the cable into the space between the pair of joining faces at a timing earlier than the timing when the pair of joining faces are joined to each other. As a result, it is possible to more reliably suppress the sandwiching of the cable between the pair of joining faces.

(3) It is preferable that the supporting portion is arranged at a location farther inward in the cable passage than a position of the joining face.

According to this configuration, the supporting portion can support the cable at a location more separated from the joining faces. Accordingly, it is possible to more reliably suppress the sandwiching of the cable between the pair of joining faces.

(4) It is preferable that the supporting portion is formed on a column portion of one divided body out of the pair of divided bodies, and a fitting hole portion is formed in another divided body out of the pair of divided bodies, the column portion being fitted into the fitting hole portion when the pair of joining faces are joined to each other.

According to this configuration, the column portion with the supporting portion formed thereon is fitted into the fitting hole portion when the pair of joining faces are joined to each other. In other words, when the pair of divided bodies are joined to each other properly, the column portion is fitted into the fitting hole portion. However, if the cable becomes sandwiched between the joining faces of the pair of divided bodies, for example, the pair of divided bodies cannot be joined properly, and the column portion cannot be fitted into the fitting hole portion at the proper position. Accordingly, by checking the fitted state of the column portion and the fitting hole portion, it is possible for a worker to visually check whether or not the pair of divided bodies have been joined properly. In other words, if an irregular assembly state arises, such as the cable being pinched between the pair of joining faces, the worker can be more reliably alerted of the problem.

(5) It is further preferable that the column portion is fixed to the fitting hole portion by press fitting.

According to this configuration, the coupling strength of the pair of divided bodies can be further raised by the fitting of the fitting hole portion and the column portion on which the supporting portion is formed.

(6) It is preferable that the cable cover further includes a passage defining portion that defines a portion of the cable passage, wherein the passage defining portion includes a protrusion portion formed on one divided body out of the pair of divided bodies, and a recession portion formed on another divided body out of the pair of divided bodies, the protrusion portion being fitted into the recession portion.

According to this configuration, the coupling strength of the pair of divided bodies can be further raised by the fitting of the protrusion portion into the recession portion. Also, due to the fitting of the protrusion portion into the recession portion, it is possible to further increase the number of portions of the pair of divided bodies that are in contact with each other. Accordingly, it is possible to more reliably suppress the generation of vibration between the pair of divided bodies. This therefore makes it possible to realize a cable cover that is particularly suitable for locations where vibration is generated.

Note that the above and other objects, features, and advantages of the present invention will become apparent by reading the following description with the attached drawings.

DETAILED DESCRIPTION OF THE INVENTION

Hereinafter, modes for carrying out the present invention will be described with reference to the drawings. Note that the present invention is broadly applicable to various applications as a cable cover that covers at least a portion of a cable that extends out from an electrical connector.

Figure 1:
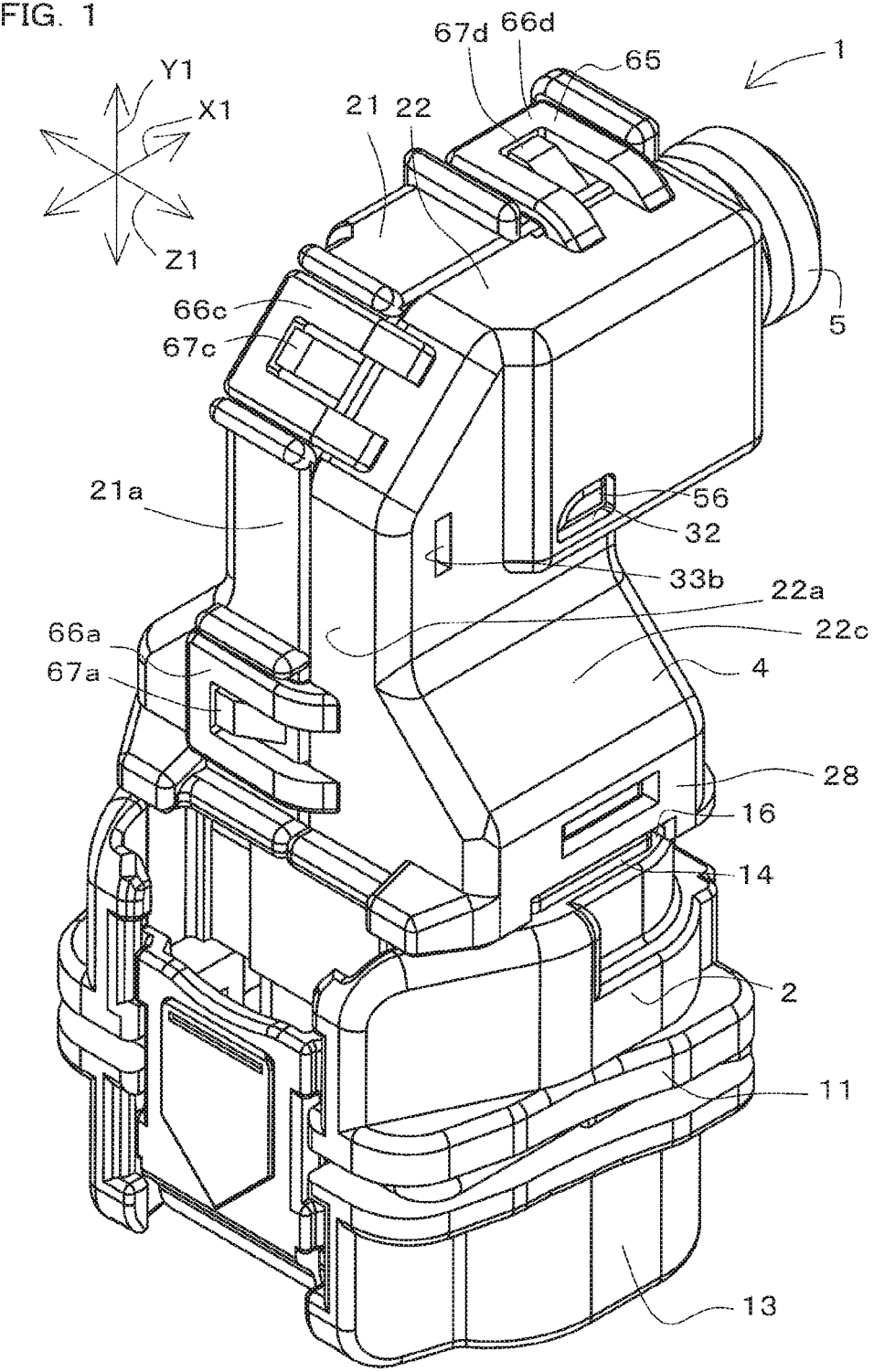
FIG. 1 is a perspective view of a connector unit according to an embodiment of the present invention, in which cables are not shown.
Figure 2:
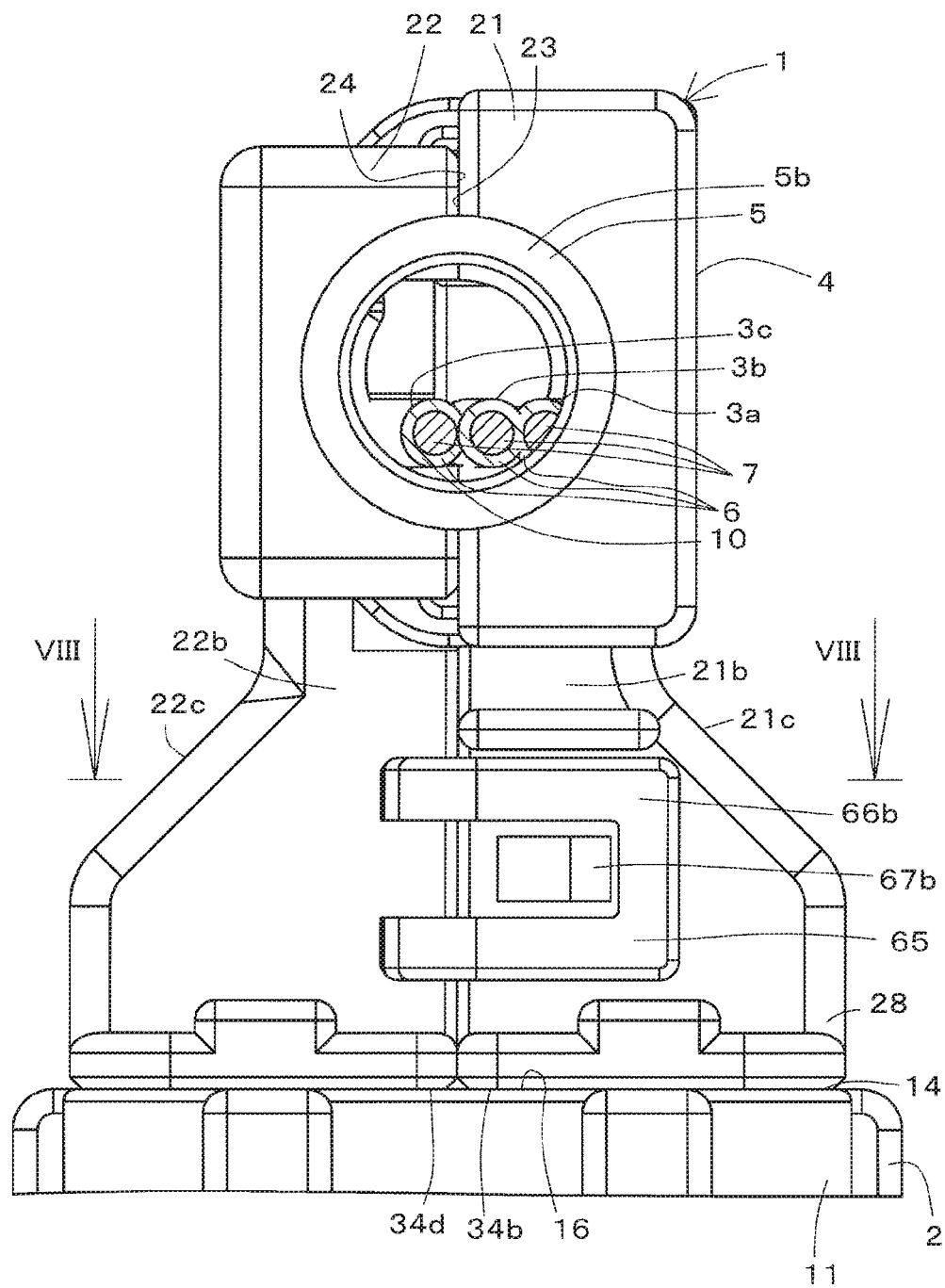
FIG. 2 is a front view of a portion of the connector unit.
Figure 3:
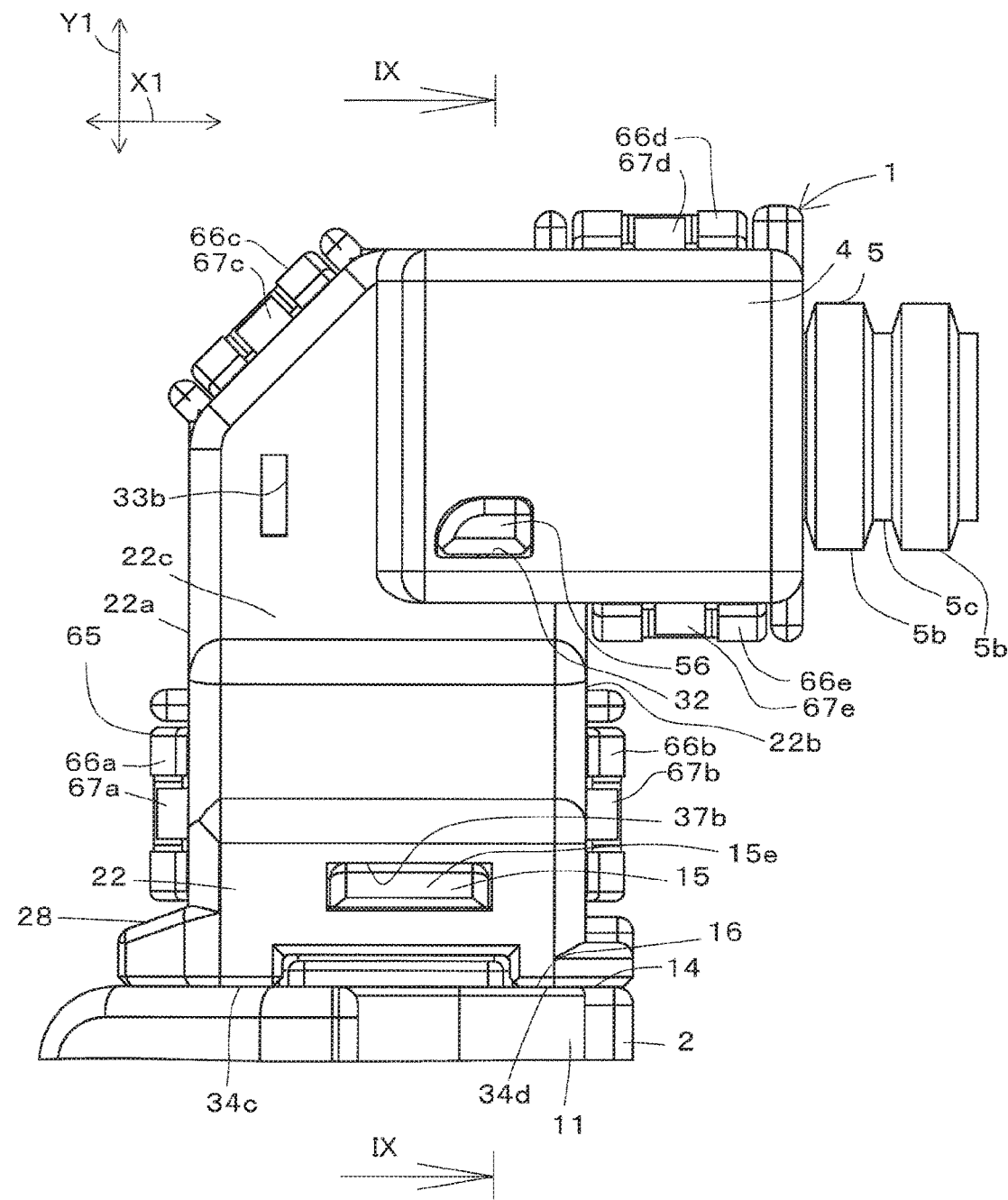
FIG. 3 is a side view of a portion of the connector unit.
Figure 4:
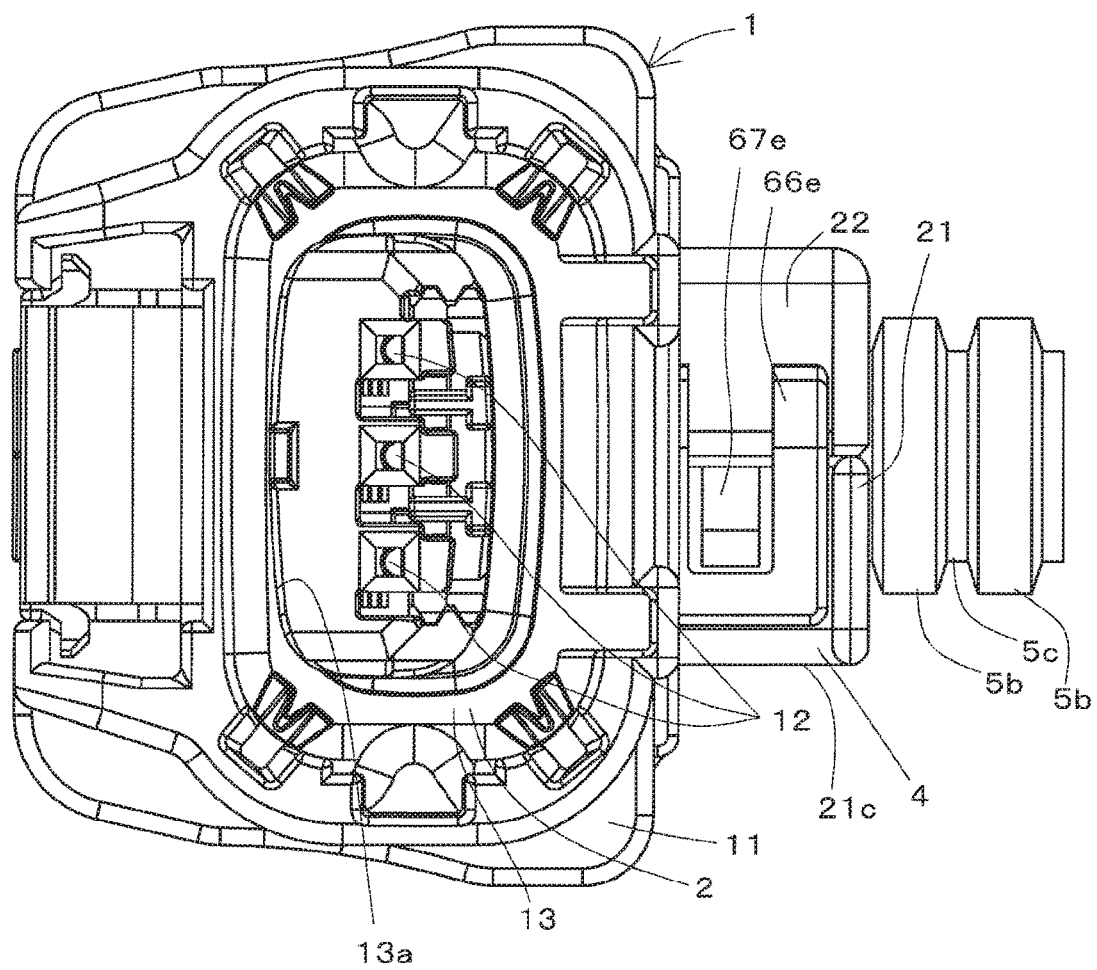
FIG. 4 is a bottom view of the connector unit.
Figure 5:
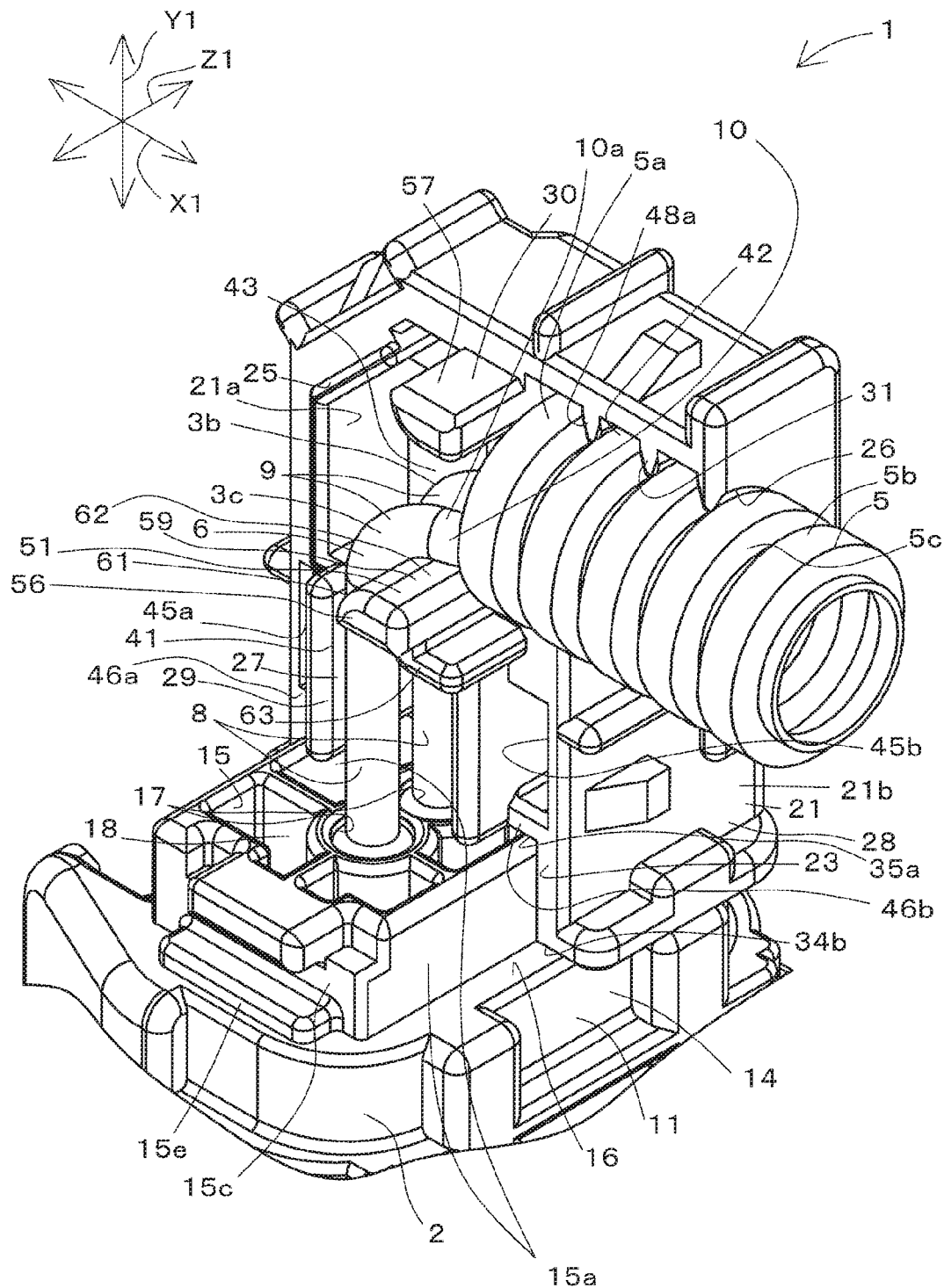
FIG. 5 is a perspective view of the connector unit, in which portions of the cables and a second divided body of the cable cover are not shown.

FIG. 1 is a perspective view of a connector unit 1 according to an embodiment of the present invention, in which cables 3a, 3b, and 3c are not shown. FIG. 2 is a front view of a portion of the connector unit 1. FIG. 3 is a side view of a portion of the connector unit 1. FIG. 4 is a bottom view of the connector unit 1. FIG. 5 is a perspective view of the connector unit 1, in which portions of the cables 3a, 3b, and 3c and a second divided body 22 of a cable cover 4 are not shown.

Figure 6:
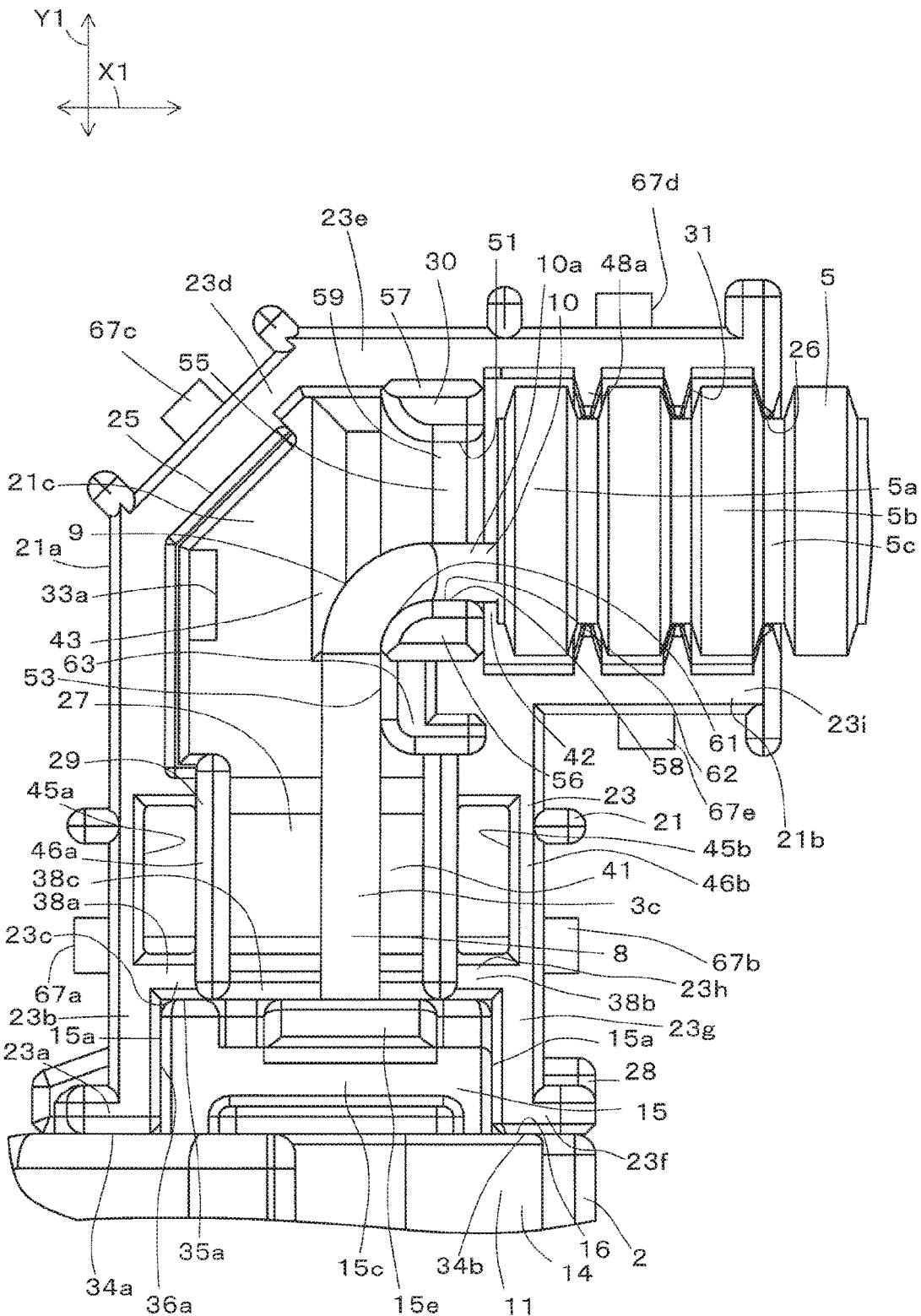
FIG. 6 is a side view of the connector unit, in which portions of the cables and the second divided body of the cable cover are not shown.
Figure 7:
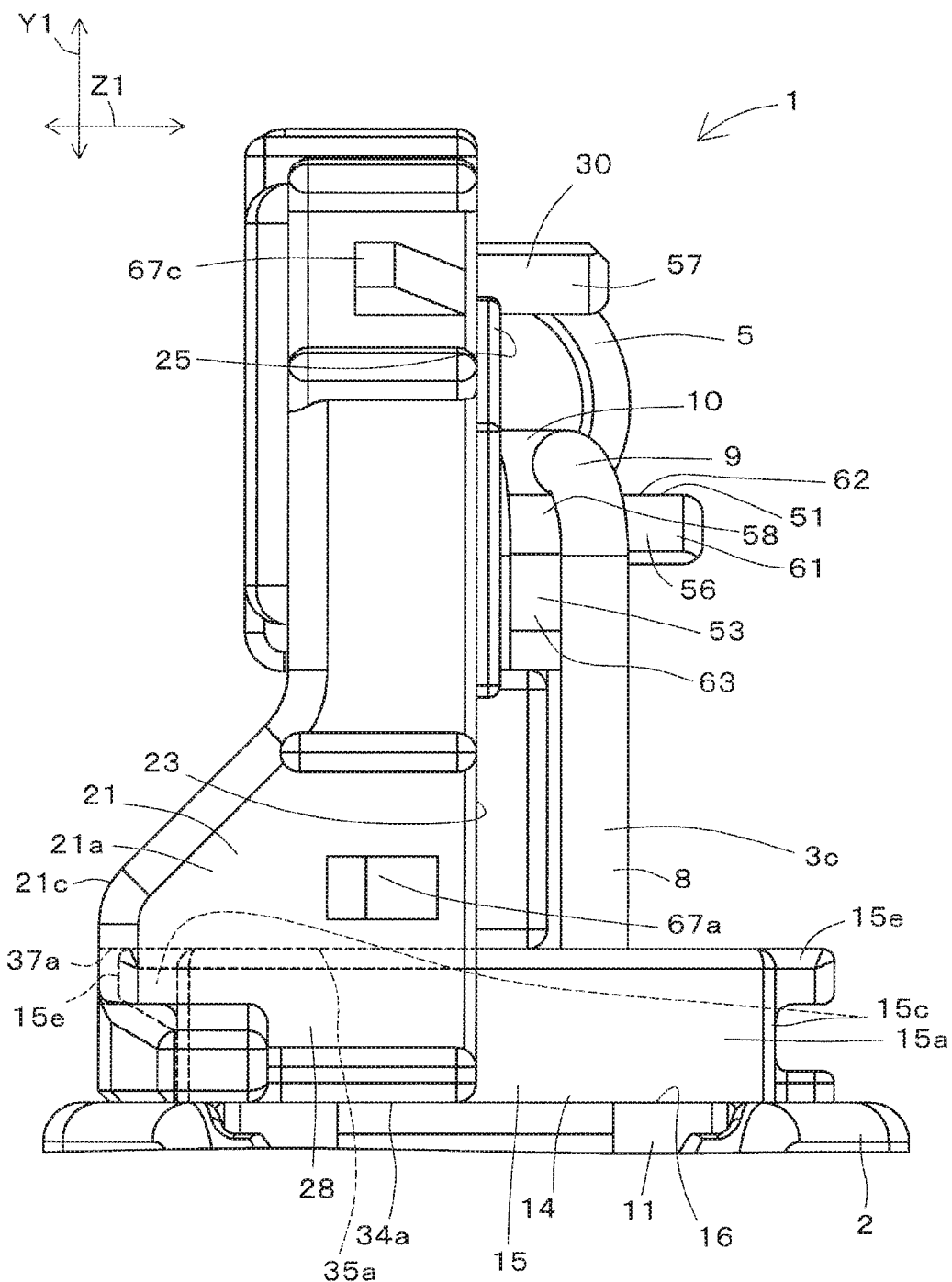
FIG. 7 is a rear view of the connector unit, in which the second divided body of the cable cover is not shown.
Figure 8:
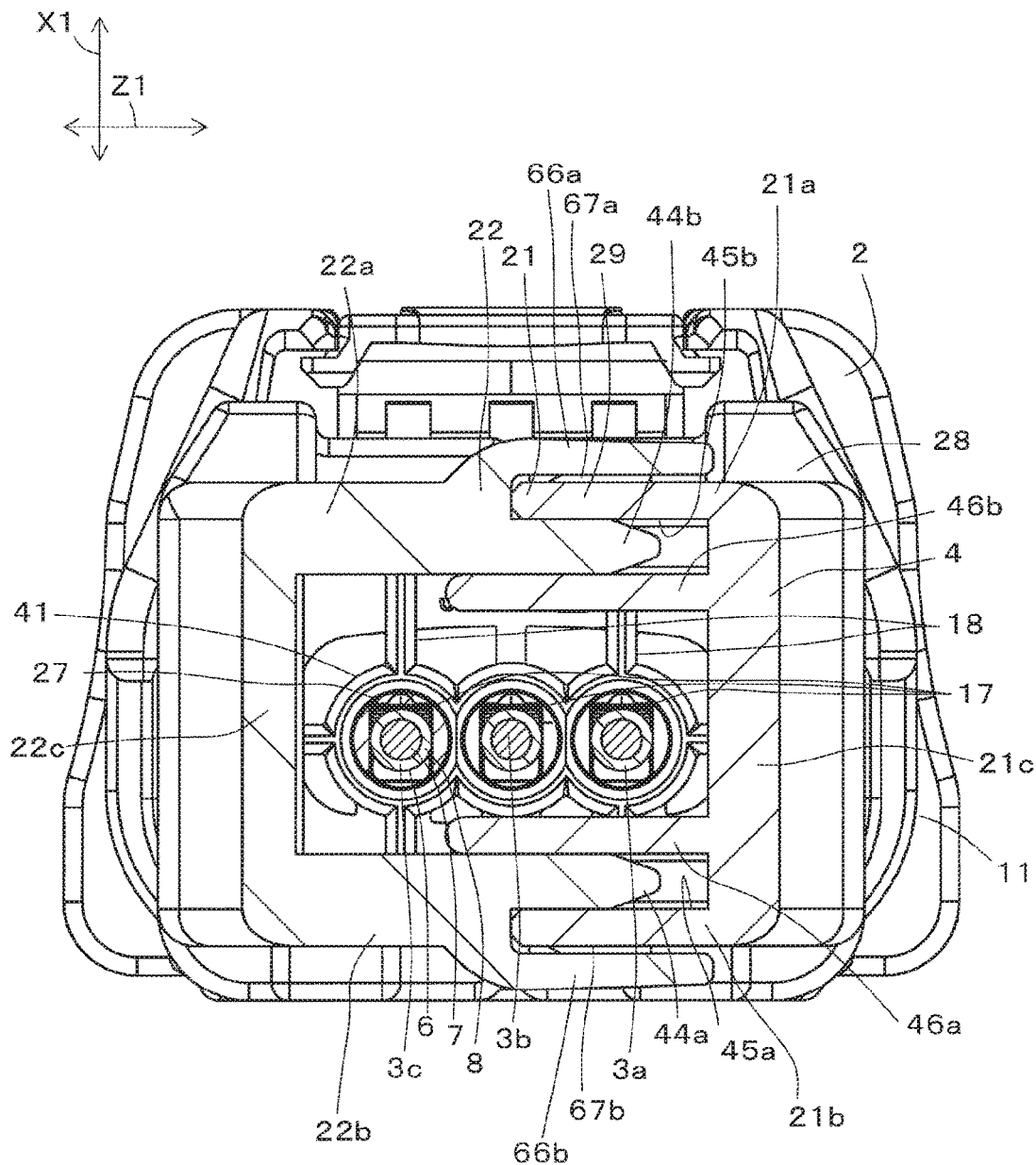
FIG. 8 is a cross-sectional view taken along line VIII-VIII in FIG. 2.
Figure 9:
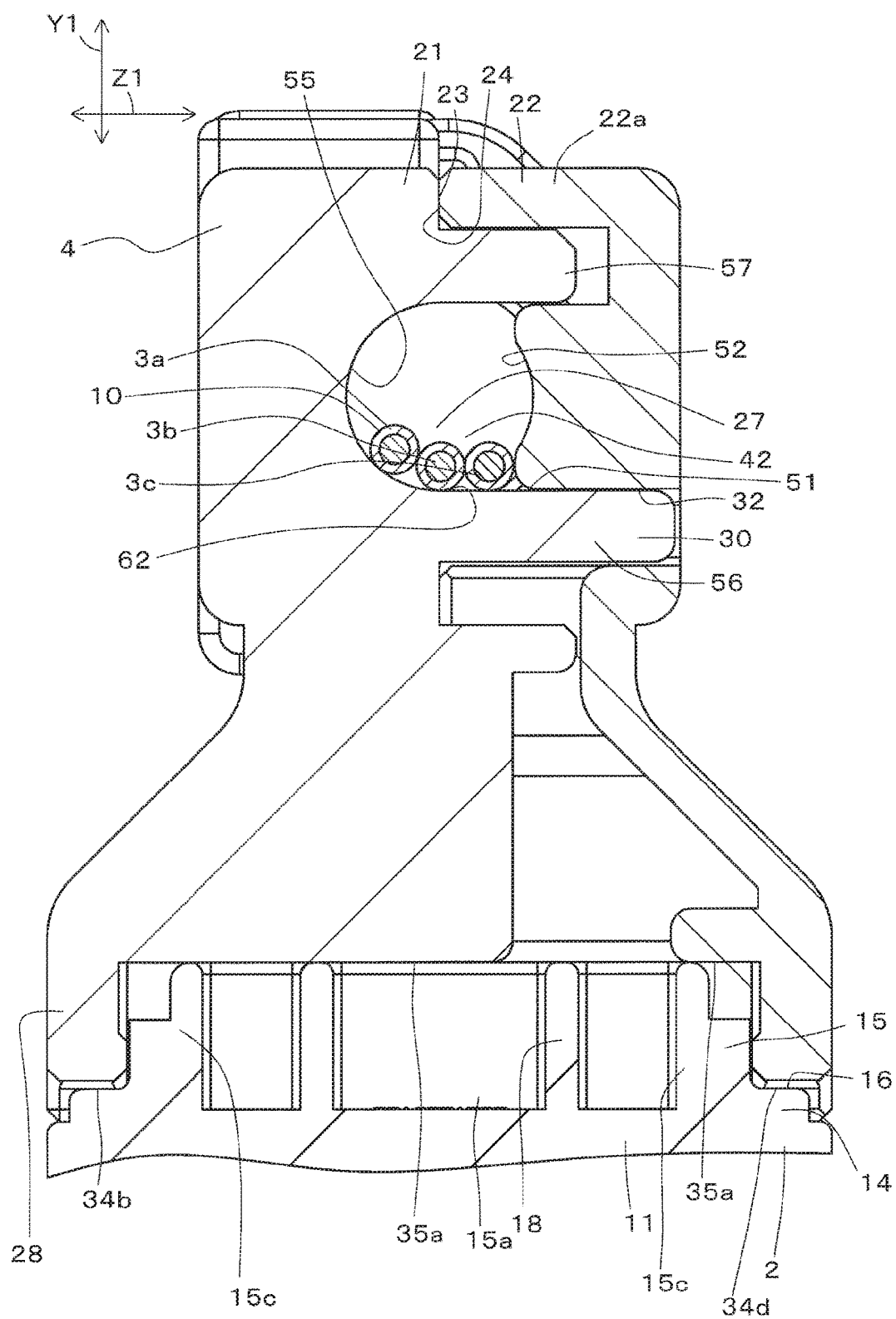
FIG. 9 is a cross-sectional view taken along line IX-IX in FIG. 3.
Figure 10:
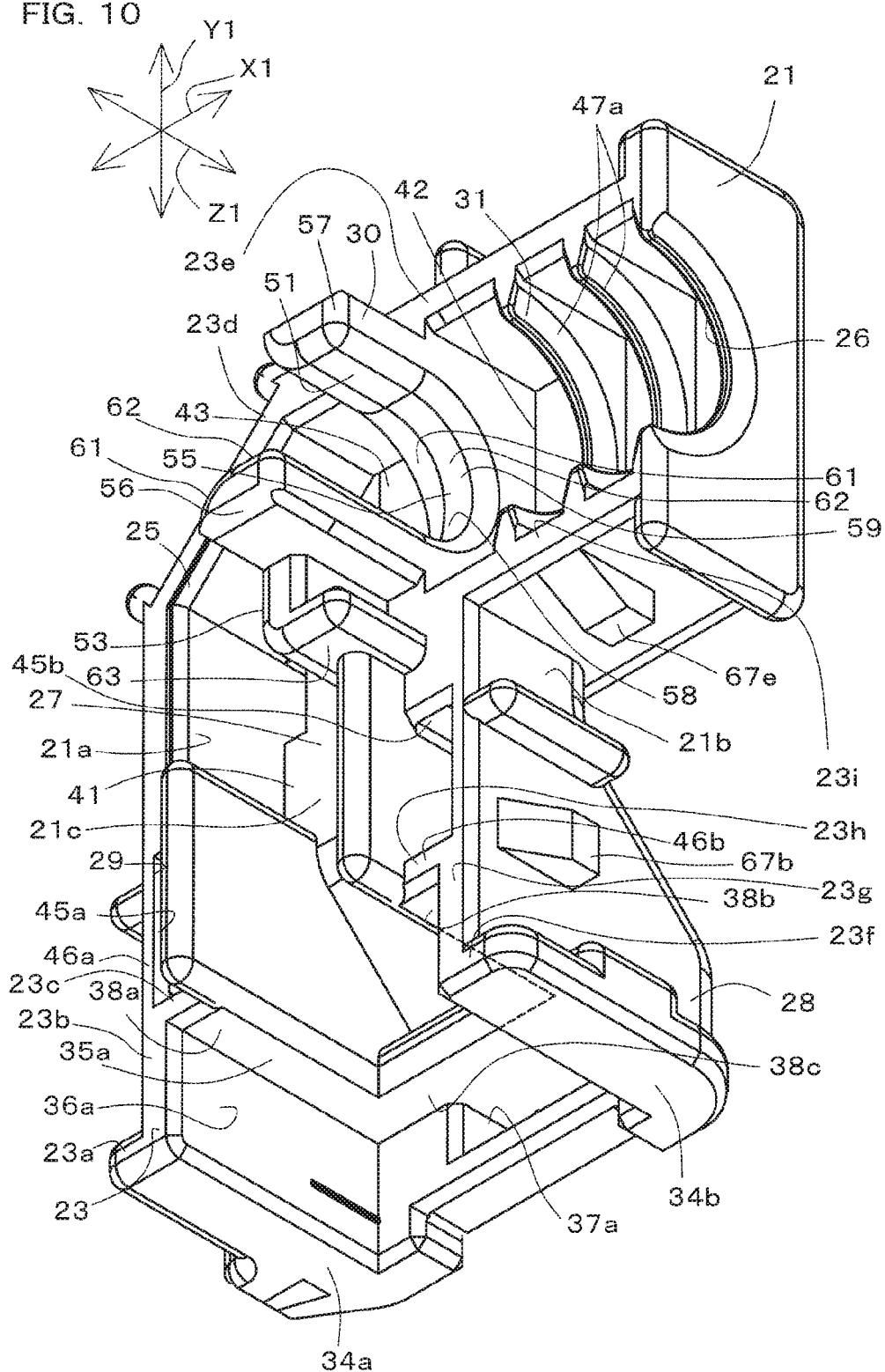
FIG. 10 is a perspective view of a first divided body of the cable cover.
Figure 11:
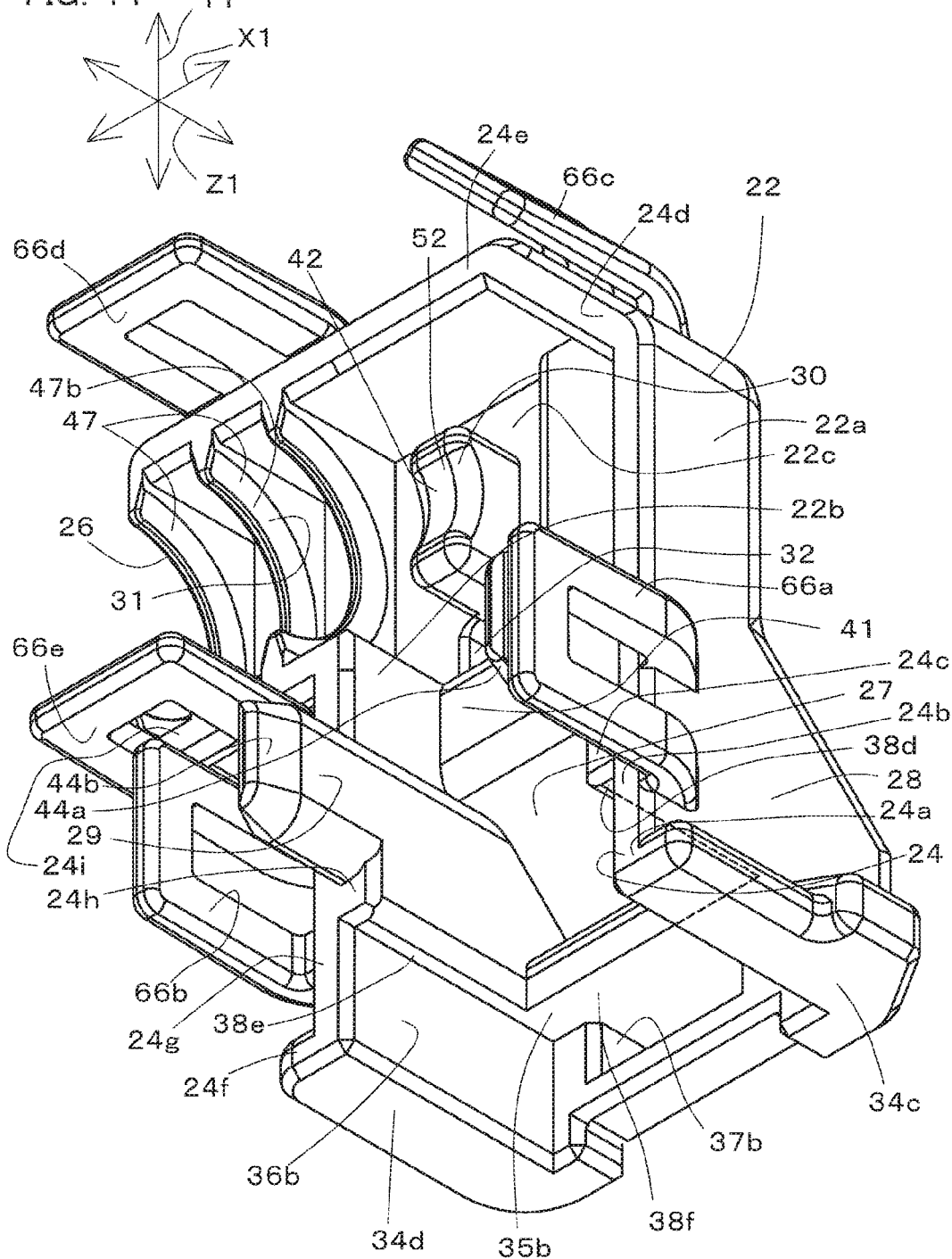
FIG. 11 is a perspective view of the second divided body of the cable cover.
Figure 12:
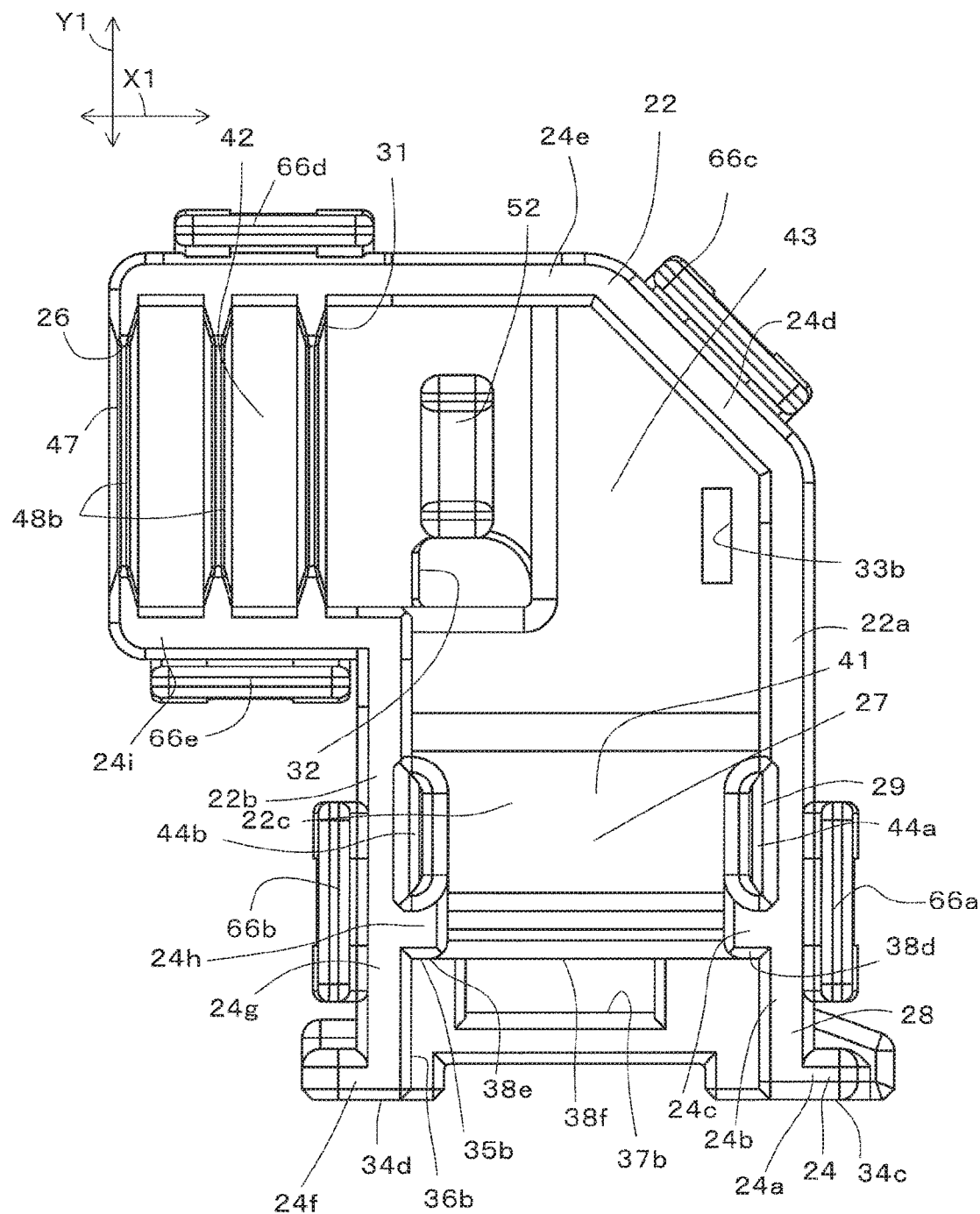
FIG. 12 is a side view of the second divided body of the cable cover.

FIG. 6 is a side view of the connector unit 1, in which portions of the cables 3a, 3b, and 3c and the second divided body 22 of the cable cover 4 are not shown. FIG. 7 is a rear view of the connector unit 1, in which the second divided body 22 of the cable cover 4 is not shown. FIG. 8 is a cross-sectional view taken along line VIII-VIII in FIG. 2. FIG. 9 is a cross-sectional view taken along line IX-IX in FIG. 3. FIG. 10 is a perspective view of a first divided body 21 of the cable cover 4. FIG. 11 is a perspective view of the second divided body 22 of the cable cover 4. FIG. 12 is a side view of the second divided body 22 of the cable cover 4.

As shown in FIGS. 1 to 5, the connector unit 1 is used in order to connect a power supply circuit (not shown) and a power supply, for example. The connector unit 1 is configured to electrically connect the power supply circuit and the power supply by being connected to a partner connector (not shown). Also, the connector unit 1 has a configuration suitable for being disposed at a location that is exposed to at least either vibration or moisture.

The connector unit 1 is disposed in the engine room of an automobile, for example. The connector unit 1 of the present embodiment is configured to be able to suppress the pinching of cables, which is a problem that occurs when the connector unit 1 is assembled.

The connector unit 1 has an electrical connector 2, cables 3a, 3b, and 3c, a cable cover 4, and a corrugated tube 5.

Note that in the present embodiment, a cable cover 4 length direction X1 will be simply referred to as the length direction X1. Also, a cable cover 4 height direction Y1 will be simply referred to as the height direction Y1. Moreover, a cable cover 4 thickness direction Z1 will be simply referred to as the thickness direction Z1. Unless particularly stated otherwise, the following description assumes the state in which the cable cover 4 has been attached to the electrical connector 2.

The electrical connector 2 (simply referred to hereinafter as the connector 2) is configured to be connected to a partner electrical connector (not shown) that is electrically connected to a power supply circuit, and also be connected to a power supply via the cables 3a, 3b, and 3c. In the present embodiment, the connector 2 is a three pole connector, and is connected to the three cables 3a, 3b, and 3c. In the present embodiment, the connector 2 is formed with a shape that is symmetrical in the thickness direction Z1.

Also, in the present embodiment, the number of cables 3a, 3b, and 3c is the same as the number of poles of the connector 2. The cables 3a, 3b, and 3c are covered electrical wires. End portions on one side of the cables 3a, 3b, and 3c are disposed inside the connector 2. The cables 3a, 3b, and 3c extend from the interior of a housing 11 of the connector 2 to the outside of the housing 11. The cables 3a, 3b, and 3c are flexible and can undergo bending deformation.

The cables 3a, 3b, and 3c each have a tubular covering portion 6 that is formed from an insulating material, and an electrical wire 7 that is covered by the covering portion 6. One end of the electrical wire 7 is exposed from the end of the covering portion 6 in the housing 11. The other end of the electrical wire 7 is in contact with an electrode or the like of the power supply. The intermediate portions of the electrical wires 7 of the cables 3a, 3b, and 3c, which are the portions other than the two end portions, are covered by the covering portions 6.

The cables 3a, 3b, and 3c each have a first straight portion 8 that is adjacent to the connector 2, a bent portion 9 that is continuous with the first straight portion 8, and a second straight portion 10 that is continuous with the bent portion 9.

The first straight portion 8 extends from the interior of the connector 2 to the outside along the height direction Y1. The bent portion 9 has a bent shape of being bent approximately 90°. The second straight portion 10 extends along the length direction X1. According to the above configuration, the cables 3a, 3b, and 3c are disposed with an "L" shape in the vicinity of the connector 2.

The connector 2 has the housing 11 and multiple contacts 12 that are held in the housing 11 (the contacts 12 are only shown in FIG. 4).

The number of contacts 12 (three in the present embodiment) is the same as the number of poles of the connector 2. The contacts 12 are arranged side-by-side in the thickness direction Z1. The contacts 12 are each a conductive member that has conductive properties, and are brought into contact with the electrical wires 7 of the corresponding cables 3a, 3b, and 3c so as to be electrically connected to the electrical wires 7. The contacts 12 are conductive members that are formed by, for example, punching out and bending a metal material that has a plating layer formed on its surface. The contacts 12 are entirely disposed in the housing 11.

The housing 11 is formed using an insulating material such as a synthetic resin. The housing 11 is a single-piece molded article that is integrally formed as a single member overall by injection molding or the like. In the present embodiment, the housing 11 is formed with a block shape.

The housing 11 has a connector connecting portion 13 and a cover connecting portion 14.

The connector connecting portion 13 has a tubular opening portion 13a. The opening portion 13a is configured such that the aforementioned partner electrical connector is inserted therein. When the partner electrical connector is connected to the opening portion 13a, contacts included in the partner electrical connector (which are not shown) come into contact with the corresponding contacts 12. The cover connecting portion 14 is arranged so as to be side-by-side with the connector connecting portion 13 in the height direction Y1. The cover connecting portion 14 supports the cable cover 4, and is provided as the portion to which the cable cover 4 is fixed.

As shown in FIGS. 1 and 5 to 8, the cover connecting portion 14 has a tubular peripheral wall portion 15, an opposing edge portion 16 formed on the outer peripheral portion of the peripheral wall portion 15, cable passage portions 17 formed inward of the peripheral wall portion 15, and reinforcing ribs 18 disposed between the peripheral wall portion 15 and the cable passage portions 17.

The peripheral wall portion 15 is a portion that faces the cable cover 4 side along the height direction Y1, and forms part of one end portion of the housing 11. The peripheral wall portion 15 is formed with an elongated quadrangular tube shape in the present embodiment.

The peripheral wall portion 15 has a pair of first side wall portions 15a, 15a that extend in the thickness direction Z1, and a pair of second side wall portions 15c, 15c that extend in the length direction X1 and are orthogonal to the pair of first side wall portions 15a, 15a.

The pair of first side wall portions 15a, 15a extend parallel with each other. The pair of second side wall portions 15c, 15c also extend parallel with each other. The pair of second side wall portions 15c, 15c have a pair of engaging protrusion portions 15e, 15e that protrude outward from the peripheral wall portion 15.

The opposing edge portion 16 is formed so as to completely surround the base end portion of the peripheral wall portion 15 in the circumferential direction of the peripheral wall portion 15. The opposing edge portion 16 is formed as a flat surface that is orthogonal to the height direction Y1.

The number of cable passage portions 17 is the same as the number of cables 3a, 3b, and 3c, and the cables 3a, 3b, and 3c each pass through a corresponding one of the cable passage portions 17. The cable passage portions 17 are each circular tube shaped and extend in the height direction Y1. The cable passage portions 17 are open toward the space for accommodating the corresponding contact 12 in the housing 11, and are open toward the space outside the housing 11. The cable passage portions 17 are arranged with the same pitch in the thickness direction Z1. Also, the cable passage portions 17 are arranged in the approximate center of the section surrounded by the peripheral wall portion 15.

Also, the reinforcing ribs 18 are provided in order to raise the strength of the joining of the cable passage portions 17 and the peripheral wall portion 15. The reinforcing ribs 18 are wall-like portions disposed between the cable passage portions 17 and the peripheral wall portion 15. Included among the reinforcing ribs 18 are two wall portions that extend in a straight line from one of the first side wall portions 15a toward the respective centers of the cable passage portions 17 at the two ends in the thickness direction Z1, two wall portions that extend in a straight line from the other first side wall portion 15a toward the respective centers of the cable passage portions 17 at the two ends in the thickness direction Z1, one wall portion that extends in a straight line from one of the second side wall portions 15c toward the center of the cable passage portions 17, and one wall portion that extends in a straight line from the other second side wall portion 15c toward the center of the cable passage portions 17. The positions of the tip portions of the peripheral wall portion 15, the cable passage portions 17, and the reinforcing ribs 18 are aligned in the height direction Y1 and in the same plane.

The cable cover 4 is fixed to the cover connecting portion 14 of the connector 2 that has the configuration described above.

The cable cover 4 is provided in order to guide the orientation of the cables 3a, 3b, and 3c that extend from the connector 2 toward the outside of the connector 2. More specifically, the cable cover 4 is provided as a member that covers portions of the first straight portions 8 of the cables 3a, 3b, and 3c, the entirety of the bent portions 9 thereof, and portions of the second straight portions 10 thereof.

In other words, the cable cover 4 is provided in order to maintain the bent shape of the bent portions 9 of the cables 3a, 3b, and 3c, and protect the portions of the cables 3a, 3b, and 3c that protrude from the connector 2. In the present embodiment, the cable cover 4 is formed with an "L" shape overall, and covers portions of the cables 3a, 3b, and 3c that are between the cable passage portions 17 of the connector 2 and one end portion 5a of the corrugated tube 5.

The corrugated tube 5 is a tubular member that is flexible and extends out from the cable cover 4, and houses portions of the cables 3a, 3b, and 3c, such as the second straight portions 10 of the cables 3a, 3b, and 3c. The corrugated tube 5 is formed using an insulating material such as a synthetic resin. The corrugated tube 5 is a single-piece molded article that is integrally formed as a single member overall by injection molding or the like.

The corrugated tube 5 has circular tube-shaped large diameter portions 5b and small diameter portions 5c, which have a smaller diameter than the large diameter portions 5b, that are arranged alternatingly, thus ensuring the flexibility of the corrugated tube 5. The cable cover 4 is disposed between the one end portion 5a of the corrugated tube 5 and the connector 2.

The cable cover 4 includes the first divided body 21 and the second divided body 22 as the pair of divided bodies.

The cable cover 4 is formed by joining the first divided body 21 and the second divided body 22 so as to sandwich the cables 3a, 3b, and 3c.

As shown in FIGS. 5 to 8 and 10 to 12, the first divided body 21 has a first side wall 21a, a second side wall 21b, and a bottom wall 21c.

The first side wall 21a and the second side wall 21b are provided as side wall portions that extend with a gap therebetween so as to sandwich the cables 3a, 3b, and 3c, and extend approximately parallel with the thickness direction Z1. The first side wall 21a extends from the cover connecting portion 14 side of the housing 11 along the cables 3a, 3b, and 3c and the height direction Y1, then extends in an inclined manner toward one side in the length direction X1 along the second straight portion 10 while moving away from the cover connecting portion 14 along the height direction Y1 so as to face the bent portion 9, and thereafter extends approximately parallel with the length direction X1 along the second straight portion 10.

The second side wall 21b extends from the cover connecting portion 14 side of the housing 11 along the cables 3a, 3b, and 3c and the height direction Y1, and then extends approximately parallel with the length direction X1 along the second straight portion 10. The bottom wall 21c is provided as a wall portion that connects end portions of the first side wall 21a and the second side wall 21b on one side in the thickness direction Z1. The bottom wall 21c extends in a straight line along the height direction Y1 so as to move away from the cover connecting portion 14, then extends in an inclined manner toward the second divided body 22 along the height direction Y1 while moving away from the housing 11, and thereafter extends approximately parallel with the height direction Y1.

The second divided body 22 has a first side wall 22a, a second side wall 22b, and a bottom wall 22c.

The first side wall 22a and the second side wall 22b are provided as side wall portions that extend with a gap therebetween so as to sandwich the cables 3a, 3b, and 3c, and extend approximately parallel with the thickness direction Z1. The first side wall 22a extends from the cover connecting portion 14 side of the housing 11 along the cables 3a, 3b, and 3c and the height direction Y1, then extends in an inclined manner toward one side in the length direction X1 while moving away from the cover connecting portion 14 along the height direction Y1 so as to face the bent portion 9, and thereafter extends approximately parallel with the length direction X1 along the second straight portion 10. The first side walls 21a and 22a of the first divided body 21 and the second divided body 22 are aligned approximately in a straight line in the thickness direction Z1.

The second side wall 22b extends from the cover connecting portion 14 side of the housing 11 along the cables 3a, 3b, and 3c and the height direction Y1, and then extends approximately parallel with the length direction X1 along the second straight portion 10. The second side walls 22a and 22b of the first divided body 21 and the second divided body 22 are aligned approximately in a straight line in the thickness direction Z1. The bottom wall 22c is provided as a wall portion that connects end portions of the first side wall 22a and the second side wall 22b on one side in the thickness direction Z1. The bottom wall 22c extends in a straight line along the height direction Y1 so as to move away from the cover connecting portion 14, then extends in an inclined manner toward the first divided body 21 along the height direction Y1 while moving away from the housing 11, and thereafter extends approximately parallel with the height direction Y1.

The first divided body 21 and the second divided body 22 are arranged so as to be separated from each other at approximately the center of the cable cover 4 in the thickness direction Z1. More specifically, the first divided body 21 has a first joining face 23. Also, the second divided body 22 has a second joining face 24. These joining faces 23 and 24 form a pair of joining faces 23 and 24. When the first divided body 21 and the second divided body 22 are joined, the joining faces 23 and 24 come into contact with each other.

The first divided body 21 and the second divided body 22 are formed so as to recede away from the corresponding joining faces 23 and 24, thus being constituted to be able to house the cables 3a, 3b, and 3c. Also, the first divided body 21 and the second divided body 22 have a configuration for holding the cables 3a, 3b, and 3c and a configuration for fixing the divided bodies 21 and 22 to each other.

The joining faces 23 and 24 extend in a direction orthogonal to the thickness direction Z1. The joining faces 23 and 24 are parallel with each other. The joining faces 23 and 24 overall extend from the housing 11 side of the connector 2 along the height direction Y1 while moving away from the housing 11, and then extend along the length direction X1.

The first joining face 23 has multiple portions, namely first to ninth portions 23a to 23i. Also, the second joining face 24 has multiple portions, namely first to ninth portions 24a to 24i. The n-th (n being an integer from 1 to 9) portion 23*n* of the first joining face 23 and the n-th portion 24*n* of the second joining face 24 are constituted to come into contact with each other.

The first to fifth portions 23*a* to 23*e* of the first joining face 23 are formed on the first side wall 21*a* of the first divided body 21. Also, the sixth to ninth portions 23*f* to 23*i* of the first joining face 23 are formed on the second side wall 21*b* of the first divided body 21. Similarly, the first to fifth portions 24*a* to 24*e* of the second joining face 24 are formed on the first side wall 22*a* of the second divided body 22. Also, the sixth to ninth portions 24*f* to 24*i* of the second joining face 24 are formed on the second side wall 22*b* of the second divided body 22.

The first portions 23*a* and 24*a* are portions that are adjacent to the opposing edge portion 16 of the cover connecting portion 14 of the housing 11, and extend parallel with the opposing edge portion 16. The second portions 23*b* and 24*b* extend from the corresponding first portions 23*a* and 24*a*.

The second portions 23*b* and 24*b* extend in a straight line along the height direction Y1 so as to move away from the housing 11. The third portions 23*c* and 24*c* extend parallel with the first portions 23*a* and 24*a* from positions on the second portions 23*b* and 24*b* that are toward the first portions 23*a* and 24*a*. The fourth portions 23*d* and 24*d* are connected to end portions of the corresponding second portions 23*b* and 24*b* on one side.

The fourth portions 23*d* and 24*d* extend in a straight line so as to move toward the corrugated tube 5 side, which is on one side in the length direction X1, as they move away from the corresponding third portions 23*c* and 24*c* in the height direction Y1. The fourth portions 23*d* and 24*d* are shorter than the corresponding third portions 23*c* and 24*c*. Also, a water stopping wall 25 is formed at a location on the first side wall 21*a* of the first divided body 21 that is adjacent to the second portion 23*b* and the fourth portion 23*d*.

The water stopping wall 25 is provided in order to suppress the intrusion of moisture such as rainwater into the cable cover 4 through a space between the joining faces 23 and 24. The water stopping wall 25 is a portion that protrudes from the inward surface of the first side wall 21*a* toward the second divided body 22. This water stopping wall 25 is formed to be approximately "V" shaped in a view from the thickness direction Z1, and can come into contact with the inward surface at a corresponding location on the first side wall 22*a* of the second divided body 22. The water stopping wall 25 is side-by-side with a later-described holding recession portion 51 in the length direction X1. The fifth portions 23*e* and 24*e* are connected to end portions of the corresponding fourth portions 23*d* and 24*d* on one side.

The fifth portions 23*e* and 24*e* extend in a straight line toward the corrugated tube 5 along the length direction X1. The fifth portions 23*e* and 24*e* are longer than the corresponding fourth portions 23*d* and 24*d*. End portions of the fifth portions 23*e* and 24*e* on one side are continuous with a tube opening portion 26 of the cable cover 4. According to the above configuration, an approximately "L" shaped joining face is formed by the first to fifth portions 23*a* to 23*e* of the first joining face 23. Similarly, an approximately "L" shaped joining face is formed by the first to fifth portions 24*a* to 24*e* of the second joining face 24.

The sixth portions 23*f* and 24*f* of the joining faces 23 and 24 are portions that are adjacent to the opposing edge portion 16 of the cover connecting portion 14 of the housing 11, and extend along the length direction X1. The sixth portions 23*f* and 24*f* are side-by-side with the corresponding first portions 23*a* and 24*a* on a straight line along the length direction X1.

The seventh portions 23*g* and 24*g* extend from the corresponding sixth portions 23*f* and 24*f*.

The seventh portions 23*g* and 24*g* extend in a straight line along the height direction Y1 so as to move away from the housing 11, and are parallel with the second portions 23*b* and 24*b*. The eighth portions 23*h* and 24*h* extend from positions on the seventh portions 23*g* and 24*g* that are toward the sixth portions 23*f* and 24*f*. The eighth portions 23*h* and 24*h* are side-by-side with the corresponding third portions 23*c* and 24*c* on a straight line along the length direction X1. The ninth portions 23*i* and 24*i* are connected to end portions of the corresponding seventh portions 23*g* and 24*g* on one side.

The ninth portion 23*i* and 24*i* extend in a straight line toward the corrugated tube 5 side along the length direction X1. The ninth portions 23*i* and 24*i* are shorter than the corresponding fifth portions 23*e* and 24*e*. End portions of the ninth portion 23*i* and 24*i* on one side are continuous with the tube opening portion 26 of the cable cover 4. According to the above configuration, an approximately "L" shaped joining face is formed by the sixth to ninth portions 23*f* to 23*i* of the first joining face 23. Similarly, an approximately "L" shaped joining face is formed by the sixth to ninth portions 24*f* to 24*i* of the second joining face 24. A cable passage 27 for housing the cables 3*a*, 3*b*, and 3*c* is formed in a space formed by joining the first joining face 23 and the second joining face 24 to each other.

Also, in the state where the first joining face 23 and the second joining face 24 have been joined to each other, the cable cover 4 is fixed to the housing 11 of the connector 2.

The cable cover 4 has the cable passage 27 in which the cables 3*a*, 3*b*, and 3*c* are arranged, a fixing portion 28 that is fixed to the cover connecting portion 14 of the housing 11, a passage defining portion 29 that is arranged in the cable passage 27 at a position adjacent to the fixing portion 28, a cable support portion 30 that is arranged in the cable passage 27 at a position adjacent to the corrugated tube 5, a tube holding portion 31 that is arranged adjacent to the cable support portion 30, a fitting hole portion 32 for checking the state of the fitting of the divided bodies 21 and 22 to each other, and water drain hole portions 33*a* and 33*b*.

The fixing portion 28 is provided on a portion of the cable cover 4 on one end side in the height direction Y1. The fixing portion 28 is configured to be capable of being attached to and detached from the housing 11 of the connector 2.

The fixing portion 28 includes first contact faces 34*a*, 34*b*, 34*c*, and 34*d* that are supported by the opposing edge portion 16 of the housing 11 of the connector 2 and serve as one end surface of the cable cover 4, second contact faces 35*a* and 35*b* that are supported by the tip portion of the peripheral wall portion 15 of the connector 2, third contact faces 36*a* and 36*b* that are supported by the outward surface of the peripheral wall portion 15 of the connector 2, and engaging hole portions 37*a* and 37*b* into which the engaging protrusion portions 15*e*, 15*e* of the peripheral wall portion 15 of the connector 2 are fitted.

The first contact faces 34*a*, 34*b*, 34*c*, and 34*d* are flat surfaces and surround the peripheral wall portion 15 of the housing 11. The first contact faces 34*a* and 34*b* are formed on the first divided body 21. These first contact faces 34*a* and 34*b* are separated from each other in the length direction X1 and are formed in an "L" shape, and extend along the thickness direction Z1.

Also, the first contact faces 34*c* and 34*d* are formed on the second divided body 22. These first contact faces 34*c* and 34*d* are separated from each other in the length direction X1 and are formed in an "L" shape, and extend along the thickness direction Z1. The first contact faces 34c and 34d are side-by-side with the corresponding first contact faces 34a and 34b on a straight line along the length direction X1.

The second contact face 35a is formed on the first divided body 21. This second contact face 35a faces the peripheral wall portion 15 and is formed on rib-shaped portions of the first divided body 21, namely a rib-shaped portion 38a that is adjacent to the third portion 23c of the first joining face 23, a rib-shaped portion 38b that is adjacent to the eighth portion 23h, and a rib-shaped portion 38c that is formed on the first divided body 21 and connects end portions of the rib-shaped portions 38a and 38b on one side. The second contact face 35a is formed in a "U" shape and comes into contact with approximately half in the length direction X1, of the tip surfaces of the first side wall portions 15a, 15a of the peripheral wall portion 15 and with the tip surface of one of the second side wall portions 15c.

The second contact face 35b is formed on the second divided body 22. This second contact face 35b faces the peripheral wall portion 15 and is formed on rib-shaped portions of the second divided body 22, namely a rib-shaped portion 38d that is adjacent to the third portion 24c of the second joining face 24, a rib-shaped portion 38e that is adjacent to the eighth portion 24h, and a rib-shaped portion 38f that is formed on the second divided body 22 and connects end portions of the rib-shaped portions 38d and 38e on one side. The second contact face 35b is formed in a "U" shape and comes into contact with approximately the remaining half, in the length direction X1, of the tip surfaces of the first side wall portions 15a, 15a of the peripheral wall portion 15 and with the tip surface of the other second side wall portion 15c.

According to the above configuration, the second contact faces 35a and 35b are overall rectangular flat surfaces that match the shape of the tip surface of the peripheral wall portion 15, and are supported by the tip portion. The third contact faces 36a and 36b are arranged between the first contact faces 34a, 34b, 34c, and 34d and the second contact faces 35a and 35b in the height direction Y1.

The third contact faces 36a and 36b are overall shaped so as to surround the outer peripheral surface of the peripheral wall portion 15. The third contact face 36a is formed on the first divided body 21. This third contact face 36a is formed in a "U" shape and comes into contact with approximately half, in the length direction X1, of the outward surfaces of the first side wall portions 15a, 15a of the peripheral wall portion 15 and with the outward surface of one of the second side wall portions 16c.

The third contact face 36b is formed on the second divided body 22. This third contact face 36b is formed in a "U" shape and comes into contact with approximately the remaining half, in the length direction X1, of the outward surfaces of the first side wall portions 15a, 15a of the peripheral wall portion 15 and with the outward surface of the other second side wall portion 16c.

The engaging hole portions 37a and 37b are formed on the two end portions of the cable cover 4 in the thickness direction Z1. The engaging hole portion 37a is formed in the bottom wall 21c of the first divided body 21 and passes through the cable cover 4. Also, the engaging hole portion 37b is formed in the bottom wall 22c of the second divided body 22 and passes through the cable cover 4. The engaging hole portions 37a and 37b are elongated in the length direction X1. The engaging hole portions 37a and 37b are inserted into the corresponding engaging protrusion portions 15e, 15e of the peripheral wall portion 15, and are thus fitted into the engaging protrusion portion 15e, 15e.

According to the above configuration, when the divided bodies 21 and 22 are joined such that the first joining face 23 of the first divided body 21 and the second joining face 24 of the second divided body 22 come into contact with each other, the cable cover 4 is fixed to the housing 11 of the connector 2. At this time, the first contact faces 34a, 34b, 34c, and 34d of the fixing portion 28 are supported by the opposing edge portion 16 of the cover connecting portion 14, and the second contact faces 35a and 35b are supported by the upper end portion of the peripheral wall portion 15 of the cover connecting portion 14. Also, the third contact faces 36a and 36b are fitted to the outward surface of the peripheral wall portion 15. Furthermore, the engaging hole portions 37a and 37b are fitted around the corresponding engaging protrusion portions 15e, 15e of the cover connecting portion 14. In this way, the fixing portion 28 surrounds the peripheral wall portion 15 and is fitted to the engaging hole portions 37a and 37b of the connector 2, thus being fixed to the cover connecting portion 14 of the connector 2.

The cable passage 27 for housing at least a portion of the cables 3a, 3b, and 3c is formed in the cable cover 4 so as to extend from the fixing portion 28 to the tube holding portion 31. The cable passage 27 is formed in both the first divided body 21 and the second divided body 22, and the cable passage 27 is provided by forming the divided bodies 21 and 22 so as to recede from the corresponding joining faces 23 and 24. The cable passage 27 is formed to be large enough to enable the positions of the cables 3a, 3b, and 3c, which are side-by-side in the thickness direction Z1, to be adjusted in the cable passage 27.

The cable passage 27 has a first passage portion 41, a second passage portion 42, and a bent passage portion 43.

The first passage portion 41 is provided for housing the portions of the first straight portions 8 of the cables 3a, 3b, and 3c that are located inside the cable cover 4. This first passage portion 41 is formed between the seventh portions 23g and 24g and the second portions 23b and 24b of the joining faces 23 and 24 of the first divided body 21 and the second divided body 22. The first passage portion 41 extends along the height direction Y1. The end portion of the first passage portion 41 in the height direction Y1 is open to the outside of the cable cover 4 and forms the opening portion into which the cables 3a, 3b, and 3c are inserted. The passage defining portion 29 is provided on the first passage portion 41.

The passage defining portion 29 is provided for forming part of the first passage portion 41. The passage defining portion 29 is also provided in order to suppress vibration between the first divided body 21 and the second divided body 22 when vibration is applied to the cable cover 4. The passage defining portion 29 is adjacent to the fixing portion 28 in the first passage portion 41.

The passage defining portion 29 has a pair of protrusion portions 44a and 44b and a pair of recession portions 45a and 45b that are fitted to the pair of protrusion portions 44a and 44b by press fitting or the like.

The pair of protrusion portions 44a and 44b are formed on either one of the pair of divided bodies 21 and 22, namely the second divided body 22. The one protrusion portion 44a extends from the inward surface of the first side wall 22a of the second divided body 22 toward the first divided body 21. The other protrusion portion 44b extends from the inward surface of the second side wall 22b of the second divided body 22 toward the first divided body 21. The protrusion portions 44a and 44b are formed as ridges that are elongated in the height direction Y1.

The pair of recession portions 45a and 45b are formed on either one of the pair of divided bodies 21 and 22, namely the first divided body 21. The one recession portion 45a is formed in the first side wall 21a of the first divided body 21. More specifically, a "U" shaped enclosure portion 46a is formed on the inward surface of the first side wall 21a of the first divided body 21, and the one recession portion 45a is formed by this enclosure portion 46a and the first side wall 21a. The enclosure portion 46a extends from the bottom wall 21c of the first divided body 21 toward the second divided body 22. Also, the enclosure portion 46a is supported by a rib 18 of the connector 2.

The other recession portion 45b is formed in the second side wall 21b of the first divided body 21. More specifically, a "U" shaped enclosure portion 46b is formed on the inward surface of the second side wall 21b of the first divided body 21, and the other recession portion 45b is formed by this enclosure portion 46b and the second side wall 21b. The enclosure portion 46b extends from the bottom wall 21c of the first divided body 21 toward the second divided body 22. Also, the enclosure portion 46b is supported by a rib 18 of the connector 2. The first passage portion 41 having the above configuration is continuous with the bent passage portion 43.

The bent passage portion 43 is provided as the portion that houses the bent portions 9 of the cables 3a, 3b, and 3c. This bent passage portion 43 is formed between the fourth portions 23d and 24d, the seventh portions 23g and 24g, and the eighth portions 23h and 24h of the joining faces 23 and 24 of the first divided body 21 and the second divided body 22. The bent passage portion 43 forms an "L" shaped path that is bent at approximately 90°. The bent passage portion 43 having the above configuration is continuous with the second passage portion 42.

The second passage portion 42 is provided as the portion that houses part of the second straight portions 10 of the cables 3a, 3b, and 3c. This second passage portion 42 is formed between the fifth portions 23e and 24e and the ninth portions 23i and 24i of the joining faces 23 and 24. The second passage portion 42 extends along the length direction X1. One end portion of the second passage portion 42 in the length direction X1 forms the tube opening portion 26. A tube holding portion 31 is formed in the second passage portion 42. The second passage portion 42 houses the second straight portions 10 of the cables 3a, 3b, and 3c that are housed in the corrugated tube 5.

The tube holding portion 31 is arranged on the tube opening portion 26 side of the second passage portion 42. The tube holding portion 31 has multiple ring-shaped portions 47.

The ring-shaped portions 47 are provided as portions that are fitted into the small diameter portions 5c of the corrugated tube 5. Multiple (e.g., three in the present embodiment) ring-shaped portions 47 are provided, and these ring-shaped portions 47 are arranged side-by-side with gaps therebetween in the length direction X1. Each ring-shaped portion 47 has a semicircular portion 47a that is formed on the first divided body 21 and a semicircular portion 47b that is formed on the second divided body 22, and the ring-shaped portion 47 is formed by joining these semicircular portions 47a and 47b to each other.

Each semicircular portion 47a is arranged in a space surrounded by the first side wall 21a, the second side wall 21b, and the bottom wall 21c of the first divided body 21, and is supported by the first side wall 21a, the second side wall 21b, and the bottom wall 21c. Similarly, each semicircular portion 47b is arranged in a space surrounded by the first side wall 22a, the second side wall 22b, and the bottom wall 22c of the second divided body 22, and is supported by the first side wall 22a, the second side wall 22b, and the bottom wall 22c.

One of the ring-shaped portions 47 is arranged at one end of the cable cover 4 and forms the tube opening portion 26 through which the corrugated tube 5 passes. The ring-shaped portions 47 are fitted into corresponding small diameter portions 5c of the corrugated tube 5. A cable support portion 30 is provided on the cable cover 4 at a position adjacent to the tube holding portion 31 having the above configuration.

The cable support portion 30 is provided in order to support the bent portions 9 of the cables 3a, 3b, and 3c, and bend-adjacent portions 10a of the second straight portions 10 that are adjacent to the bent portions 9. The length of the cable support portion 30 in the length direction X1 is approximately twice the diameter of one of the cables 3a, 3b, and 3c.

As shown in FIGS. 5, 6, and 9 to 12, the cable support portion 30 has a holding recession portion 51, a pressing portion 52 that is fitted into the holding recession portion 51, and a straight guide portion 53 that is arranged in the first passage portion 41 at a position adjacent to the holding recession portion 51.

The holding recession portion 51 is provided in one of the pair of divided bodies 21 and 22, namely the first divided body 21 in the present embodiment. The holding recession portion 51 is arranged in the vicinity of the boundary between the bent passage portion 43 and the second passage portion 42 in the cable passage 27. In a view along the length direction X1, the holding recession portion 51 is formed in the shape of a "U" and is open toward the second divided body 22 side. The holding recession portion 51 is side-by-side with the tube holding portion 31 in the length direction X1.

The holding recession portion 51 has a bottom portion 55, an inward column portion 56, an outward column portion 57, and a supporting portion 58 that is formed on the bottom portion 55, the inward column portion 56, and the outward column portion 57.

The bottom portion 55 is surrounded by the first side wall 21a, the second side wall 21b, and the bottom wall 21c of the first divided body 21, and is supported by the first side wall 21a, the second side wall 21b, and the bottom wall 21c. The bottom portion 55 is shaped as a semicircular recession. A portion of the bottom portion 55 is arranged at the inward portion of the curved shape of the bent portions 9 of the cables 3a, 3b, and 3c. The inward column portion 56 extends toward the second divided body 22 from one end portion of the bottom portion 55 in the height direction Y1.

The inward column portion 56 is provided for suppressing the sandwiching of the cables 3a, 3b, and 3c between the seventh portions 23g and 24g of the joining faces 23 and 24 of the divided bodies 21 and 22, and between the ninth portions 23i and 24i of the same. Also, the inward column portion 56 is provided for suppressing the sandwiching of the cables 3a, 3b, and 3c between the one end portion 5a of the corrugated tube 5 and the divided bodies 21 and 22. The inward column portion 56 is adjacent to the ninth portion 23i of the first joining face 23 of the first divided body 21, and protrudes from the ninth portion 23i toward the second divided body 22.

The inward column portion 56 is arranged inward of the bending center (center of curvature) of the bent portions 9 of the cables 3a, 3b, and 3c. Specifically, the inward column portion 56 is arranged at the inward portion of the bent shape of the bent portions 9 of the cables 3a, 3b, and 3c, and is in contact with the bent portions 9. Also, the gap between the inward column portion 56 and the one end portion 5a of the corrugated tube 5 is set to a gap less than the diameter of the corrugated tube 5. The inward column portion 56 is arranged so as to be in contact with the bent portions 9 and the bend-adjacent portions 10a of the cables 3a, 3b, and 3c in the state where the cable cover 4 is attached to the connector 2. The outward column portion 57 and the inward column portion 56 are side-by-side in the height direction Y1 with a gap therebetween that is larger than the diameter of the cables 3a, 3b, and 3c.

In a view from the thickness direction Z1, the inward column portion 56 is arranged to be symmetrical with the outward column portion 57 in the height direction Y1. The outward column portion 57 extends toward the second divided body 22 from the other end portion of the bottom portion 55 in the height direction Y1.

The outward column portion 57 is provided for suppressing the sandwiching of the cables 3a, 3b, and 3c between the fifth portions 23e and 24e of the joining faces 23 and 24 of the divided bodies 21 and 22. Also, the outward column portion 57 is provided for suppressing the sandwiching of the cables 3a, 3b, and 3c between the one end portion 5a of the corrugated tube 5 and the divided bodies 21 and 22. The outward column portion 57 is adjacent to the fifth portion 23e of the first joining face 23 of the first divided body 21, and protrudes from the fifth portion 23e toward the second divided body 22.

The outward column portion 57 is arranged outward of the bending center (center of curvature) of the bent portions 9 of the cables 3a, 3b, and 3c. The gap between the outward column portion 57 and the one end portion 5a of the corrugated tube 5 is set to a gap less than the diameter of the corrugated tube 5. The amount of protrusion of the inward column portion 56 from the bottom portion 55 is greater than the amount of protrusion of the outward column portion 57 from the bottom portion 55.

The inward column portion 56, the bottom portion 55, and the outward column portion 57 having the above configurations overall form a "U" shaped inward surface 59 that faces the cables 3a, 3b, and 3c. This "U" shaped inward surface 59 is formed so as to have the same shape with respect to the cross-section orthogonal to a forward direction from the inward column portion 56 toward the outward column portion 57 via the bottom portion 55 along the "U" shape.

The inward surface 59 of the holding recession portion 51 includes a supporting portion 58. The supporting portion 58 is provided so as to support the bent portions 9 and the second straight portions 10 of the cables 3a, 3b, and 3c. This supporting portion 58 extends as a curved surface along the forward direction of the cables 3a, 3b, and 3c in the bent passage portion 43, and is configured to be able to support the inward portion of the bent shape of the bent portions 9. The supporting portion 58 protrudes from the first joining face 23 of the first divided body 21 toward the second divided body 22 in the thickness direction Z1 (i.e., the direction in which the joining faces 23 and 24 face each other).

Also, in a view from the thickness direction Z1, the supporting portion 58 is arranged at a position that is farther inward in the cable passage 27 than the position of the first joining face 23. More specifically, the supporting portion 58 is arranged inward in the cable passage 27 relative to an "L" shaped portion divided by the seventh portion 23g and the ninth portion 23i of the first joining face 23.

The supporting portion 58 includes a curved portion 61 and a straight portion 62.

The curved portion 61 is provided as a portion that can come into contact with the bent portions 9 of the cables 3a, 3b, and 3c. The cross-section of the curved portion 61 orthogonal to the forward direction from the inward column portion 56 of the supporting portion 58 toward the outward column portion 57 via the bottom portion 55 is shaped as a ¼ circle having a radius of curvature that is approximately the same as the radius of curvature of the portion inward of the bend in the bent portions 9 of the cables 3a, 3b, and 3c. Accordingly, the portions of the cables 3a, 3b, and 3c that are supported by the curved portion 61 of the supporting portion 58 are maintained in an approximately 90° bent shape. The end portion of the curved portion 61 that is toward the tube holding portion 31 is continuous with the straight portion 62.

The straight portion 62 is provided as a portion that extends in a straight line along the length direction X1. The straight portion 62 supports the outer peripheral surfaces of the bend-adjacent portions 10a of the second straight portions 10 of the cables 3a, 3b, and 3c. According to this configuration, the cables 3a, 3b, and 3c can be smoothly inserted into the space inside the corrugated tube 5. The straight guide portion 53 is provided at a position adjacent to the holding recession portion 51 having the above configuration.

The straight guide portion 53 is a portion formed on the surface of an "L" shaped column portion 63 that is arranged at a position adjacent to the inward column portion 56. The height of the column portion 63 from the first joining face 23 is set to a height lower than the height of the inward column portion 56 from the first joining face 23. The straight guide portion 53 protrudes from the first joining face 23 and extends toward the second divided body 22. The straight guide portion 53 is formed on a flat surface that extends parallel with the length direction X1. The straight guide portion 53 is configured to support portions of the first straight portions 8 of the cables 3a, 3b, and 3c that are in the vicinity of the bent portions 9.

Also, the pressing portion 52 is arranged between the inward column portion 56 and the outward column portion 57 of the holding recession portion 51. The pressing portion 52 is provided in order to prevent the portions of the cables 3a, 3b, and 3c that are housed in the holding recession portion 51 from becoming separated from the holding recession portion 51. The holding recession portion 51 is a projecting portion provided on the portion of the bottom wall 22c of the second divided body 22 that faces the holding recession portion 51. The tip surface of the pressing portion 52 that faces the holding recession portion 51 is shaped as a circular arc that recedes toward the bottom wall 22c.

As shown in FIGS. 1, 3, 6, and 9, the tip portion of the inward column portion 56 of the holding recession portion 51 having the above configuration is fitted into the fitting hole portion 32 formed in the second divided body 22. The fitting hole portion 32 is formed in a portion of the second divided body 22 that faces the inward column portion 56, and is formed with a shape that corresponds to the outer shape of the inward column portion 56 in a view from the thickness direction Z1. When the joining faces 23 and 24 of the divided bodies 21 and 22 are joined to each other, the inward column portion 56 is fixed to the fitting hole portion 32 by press fitting. Note that the inward column portion 56 and the fitting hole portion 32 may be fitted to each other with a clearance. Also, the tip portion of the outward column portion 57 may be sandwiched between the first side wall 22a of the second divided body 22 and the pressing portion 52.

Also, the cable cover 4 is provided with water drain hole portions 33a and 33b for the draining of moisture that has intruded into the cable passage 27. The water drain hole portion 33a is formed in the bottom wall 21c of the first divided body 21 so as to be side-by-side with the holding recession portion 51 in the length direction X1, and is formed by a through-hole that extends in an elongated manner in the height direction Y1 in the present embodiment. This water drain hole portion 33a is adjacent to the first side wall 21a. The water drain hole portion 33b is arranged so as to be aligned with the water drain hole portion 33a in the thickness direction Z1. The water drain hole portion 33b is formed in the bottom wall 22c of the second divided body 22, and is formed by a through-hole that extends in an elongated manner in the height direction Y1 in the present embodiment.

The cable cover 4 has a lock mechanism 65 that fixes the pair of divided bodies 21 and 22 to each other.

The lock mechanism 65 includes lock claw portions 66a to 66e that are formed on the second divided body 22 and lock piece portions 67a to 67e that are formed on the first divided body 21 and become coupled to the corresponding lock claw portions 66a to 66e.

The lock claw portions 66a to 66e are formed with a "U" shape, for example, and have a pair of elongated portions that extend toward the first divided body 21 and a tip portion that connects the tips of the pair of elongated portions. The lock claw portions 66a to 66e are arranged on the outer peripheral portion of the second divided body 22 with gaps therebetween in a view from the thickness direction Z1. The lock claw portions 66a and 66b are respectively provided on the first side wall 21a and the second side wall 21b at locations adjacent to the fixing portion 28. The lock claw portion 66c is formed on the first side wall 22a at location adjacent to where the fourth portion 23d of the first joining face 23 is formed. The lock claw portions 66d and 66e are respectively provided on the first side wall 22a and the second side wall 22b at locations adjacent to the tube holding portion 31.

The lock elongated portions 67a to 67e are projecting portions formed on the outward surface of the first divided body 21, and are coupled to the lock claw portions 66a to 66e by supporting the tip portions of the corresponding lock claw portions 66a to 66e.

As described above, according to the present embodiment, when the pair of divided bodies 21 and 22 are joined to each other, the cables 3a, 3b, and 3c can be arranged inside the pair of divided bodies 21 and 22 while being supported by the supporting portion 58. Accordingly, when the pair of divided bodies 21 and 22 are joined to each other, it is possible to suppress the case where the cables 3a, 3b, and 3c become arranged between the pair of joining faces 23 and 24. Accordingly, it is possible to suppress pinching of the cables 3a, 3b, and 3c during assembly of the cable cover 4. Also, the supporting portion 58 extends as a curved surface along the forward direction of the cables 3a, 3b, and 3c in the bent passage portion 43, and is configured to be able to support the inward portion of the bend in the bent portions 9. In this way, the supporting portion 58 is arranged so as to extend along the bent shape of the cables 3a, 3b, and 3c. Accordingly, when the cables 3a, 3b, and 3c and the supporting portion 58 come into contact with each other, the supporting portion 58 can support a wider range of the bent portions 9 of the cables 3a, 3b, and 3c, thus making it possible to suppress the application of a large amount of stress to the bent portions 9 of the cables 3a, 3b, and 3c. Accordingly, it is possible to alleviate the load applied to the cables 3a, 3b, and 3c from the supporting portion 58. As described above, it is possible to suppress the pinching of the cables 3a, 3b, and 3c during assembly of the cable cover 4, and to alleviate the load applied to the cables 3a, 3b, and 3c in the cable cover 4.

Also, according to the present embodiment, the supporting portion 58 is formed on the first divided body 21 and protrudes from the first joining face 23 of the first divided body 21 toward the second divided body 22. According to this configuration, the supporting portion 58 enters the space on the second divided body 22 side at a relatively early timing when the pair of divided bodies 21 and 22 are joined to each other. Accordingly, the supporting portion 58 can function as an obstruction wall that prevents the intrusion of the cables 3a, 3b, and 3c into the space between the pair of joining faces 23 and 24 at a timing earlier than the timing when the pair of joining faces 23 and 24 are joined to each other. As a result, it is possible to more reliably suppress the sandwiching of the cables 3a, 3b, and 3c between the pair of joining faces 23 and 24.

Also, according to the present embodiment, the supporting portion 58 is arranged at a location farther inward in the cable passage 27 than the position of the first joining face 23. According to this configuration, the supporting portion 58 can support the cables 3a, 3b, and 3c at a location more separated from the joining faces 23 and 24. Accordingly, it is possible to more reliably suppress the sandwiching of the cables 3a, 3b, and 3c between the pair of joining faces 23 and 24.

Also, according to the present embodiment, the inward column portion 56 with the supporting portion 58 formed thereon is fitted into the fitting hole portion 32 of the second divided body 22 when the pair of joining faces 23 and 24 are joined to each other. In other words, when the pair of divided bodies 21 and 22 are joined to each other properly, the inward column portion 56 is fitted into the fitting hole portion 32. However, if any of the cables 3a, 3b, and 3c becomes sandwiched between the joining faces 23 and 24 of the pair of divided bodies 21 and 22, for example, the pair of divided bodies 21 and 22 cannot be joined properly, and the inward column portion 56 cannot be fitted into the fitting hole portion 32 at the proper position. Accordingly, by checking the fitted state of the inward column portion 56 and the fitting hole portion 32, it is possible for a worker to visually check whether or not the pair of divided bodies 21 and 22 have been joined properly. In other words, if an irregular assembly state arises, such as the cables 3a, 3b, and 3c being pinched between the pair of joining faces 23 and 24, the worker can be more reliably alerted of the problem.

Also, according to the present embodiment, the inward column portion 56 is fixed to the fitting hole portion 32 by press fitting. According to this configuration, the coupling strength of the pair of divided bodies 21 and 22 can be further raised by the fitting of the fitting hole portion 32 and the inward column portion 56 on which the supporting portion 58 is formed.

Moreover, according to the present embodiment, the coupling strength of the pair of divided bodies 21 and 22 can be further raised by the fitting of the protrusion portions 44a and 44b of the passage defining portion 29 of the cable cover 4 into the corresponding recession portions 45a and 45b. Also, due to the fitting of the protrusion portions 44a and 44b and the corresponding recession portions 45a and 45b, it is possible to further increase the number of portions of the pair of divided bodies 21 and 22 that are in contact with each other. Accordingly, it is possible to more reliably suppress the generation of vibration between the pair of divided bodies 21 and 22. This therefore makes it possible to realize a cable cover 4 that is particularly suitable for locations where vibration is generated.

Although embodiments of the present invention have been described above, the present invention is not limited to these embodiments, and various modifications can be made without departing from the description of the claims. For example, modifications such as the following may be implemented.

(1) In the above embodiment, the cables 3a, 3b, and 3c are arranged in a manner of being bent approximately 90°, but the present invention is not limited in this manner. The cables 3a, 3b, and 3c may be bent at an angle less than 90° or greater than 90°.

(2) In the above embodiment, a description is given of an example in which the cable cover 4 is fixed to the housing 11 of the connector 2. However, the present invention is not limited in this manner. For example, the cable cover 4 is not required to be fixed to the connector 2.

(3) The supporting portion 58 may be formed on the second divided body 22 instead of the first divided body 21.

(4) A configuration is possible in which the protrusion portions 44a and 44b of the passage defining portion 29 are formed on the first divided body 21, and the recession portions 45a and 45b are formed in the second divided body 22.

(5) In the above embodiment, a description is given of an example in which the cable cover 4 is provided with various configurations. However, the present invention is not limited in this manner. It is sufficient that the cable cover includes at least the pair of divided bodies, the cable passage, and the supporting portion.

The present invention is broadly applicable as a cable cover. The present invention is not limited to the embodiments described above, and other variations and applications will of course become apparent by reading and understanding this specification. The present invention is not limited to the above embodiment, and all modifications, applications, and equivalents thereof that fall within the claims, for which modifications and applications would become naturally apparent by reading and understanding the present specification, are intended to be embraced in the claims.

What is claimed is:

1. A cable cover comprising:
a pair of divided bodies that respectively include a pair of joining faces that are to be joined to each other, the pair of divided bodies being joined together so as to sandwich a cable that extends from an electrical connector to the outside of the electrical connector;
a cable passage that includes a bent passage portion in which a predetermined bent portion of the cable is to be housed, the cable passage being provided inside the pair of divided bodies, and being configured to house at least a portion of the cable; and
a supporting portion that protrudes from a divided body out of the pair of divided bodies, the supporting portion extending as a curved surface along a forward direction of the cable in the bent passage portion, extending partially around the cable, and being configured to be able to support an inward portion of a bend in the bent portion.

2. The cable cover according to claim 1,
wherein the supporting portion is provided on one divided body out of the pair of divided bodies, and
the supporting portion protrudes from the joining face of the one divided body in a facing direction in which the joining faces of the pair of divided bodies face each other.

3. The cable cover according to claim 1,
wherein the supporting portion is formed on a column portion of one divided body out of the pair of divided bodies, and
a fitting hole portion is formed in another divided body out of the pair of divided bodies, the column portion being fitted into the fitting hole portion when the pair of joining faces are joined to each other.

4. The cable cover according to claim 3, wherein the column portion is fixed to the fitting hole portion by press fitting.

5. The cable cover according to claim 1,
further comprising a passage defining portion that defines a portion of the cable passage, wherein the passage defining portion includes a protrusion portion formed on one divided body out of the pair of divided bodies, and a recession portion formed on another divided body out of the pair of divided bodies, the protrusion portion being fitted into the recession portion.

* * * * *